United States Patent
Mitsui et al.

(10) Patent No.: US 12,144,284 B2
(45) Date of Patent: Nov. 19, 2024

(54) COMBINE HARVESTER WITH A THRESHING DEVICE AND DETACHABLE TOP PLATE

(71) Applicant: Kubota Corporation, Osaka (JP)

(72) Inventors: Takafumi Mitsui, Sakai (JP); Yusaku Yoshida, Sakai (JP); Yosuke Sakiyama, Sakai (JP); Fumisato Nakagawa, Sakai (JP); Yoshiaki Inoue, Sakai (JP); Norifumi Takamatsu, Sakai (JP); Kosaku Noguchi, Sakai (JP); Ryohei Higashitaki, Sakai (JP); Toshinari Nishimura, Sakai (JP)

(73) Assignee: Kubota Corporation, Osaka (JP)

( * ) Notice: Subject to any disclaimer, the term of this patent is extended or adjusted under 35 U.S.C. 154(b) by 795 days.

(21) Appl. No.: 17/264,088

(22) PCT Filed: Jul. 30, 2019

(86) PCT No.: PCT/JP2019/029841
§ 371 (c)(1),
(2) Date: Jan. 28, 2021

(87) PCT Pub. No.: WO2020/027136
PCT Pub. Date: May 6, 2020

(65) Prior Publication Data
US 2021/0368679 A1  Dec. 2, 2021

(30) Foreign Application Priority Data

Jul. 30, 2018 (JP) ................................. 2018-142735
Jul. 30, 2018 (JP) ................................. 2018-142736
Jul. 30, 2018 (JP) ................................. 2018-142737

(51) Int. Cl.
*A01D 41/02* (2006.01)
*A01D 41/12* (2006.01)
*A01F 7/06* (2006.01)

(52) U.S. Cl.
CPC ......... *A01D 41/02* (2013.01); *A01D 41/1252* (2013.01); *A01F 7/067* (2013.01); *A01D 41/1208* (2013.01)

(58) Field of Classification Search
CPC ... A01F 7/00–7/70; A01F 12/00–12/60; A01F 7/067; A01D 41/00–41/16;
(Continued)

(56) References Cited

U.S. PATENT DOCUMENTS 3,848,609 A * 11/1974 Mortier ................... A01F 12/16
                                                              460/71
5,334,093 A    8/1994 Jensen et al.
(Continued)

FOREIGN PATENT DOCUMENTS

EP         0522268 B1    1/1996
JP        S61274612 A   12/1986
(Continued)

*Primary Examiner* — Adam J Behrens
*Assistant Examiner* — Madeline I Runco
(74) *Attorney, Agent, or Firm* — The Webb Law Firm

(57) ABSTRACT

A combine harvester includes a threshing device 4 configured to perform a threshing process of threshing reaped grain culm in a threshing chamber 23, in which the threshing chamber 23 includes a threshing cylinder 31 configured to rotate around a front-rear axis X, and an arc-shaped receiving net 32 provided extending along an outer circumferential portion of the threshing cylinder 31, and a top plate 30 covering an upper portion of the threshing chamber 23 is supported detachably along the rotation axis direction of the threshing cylinder 31.

8 Claims, 21 Drawing Sheets

(58) Field of Classification Search
CPC .... A01D 67/00; A01D 41/02; A01D 41/1252; A01D 41/1208
See application file for complete search history.

(56) References Cited

U.S. PATENT DOCUMENTS

| | | | |
|---|---|---|---|
| 5,445,563 A | 8/1995 | Stickler et al. | |
| 6,325,713 B1 * | 12/2001 | Haar | A01D 41/12 460/119 |
| 6,485,365 B2 * | 11/2002 | Imel | A01F 12/26 460/119 |
| 8,231,446 B2 | 7/2012 | Pope et al. | |
| 8,628,390 B2 * | 1/2014 | Baltz | A01F 12/24 460/109 |
| 10,051,790 B2 * | 8/2018 | Regier | A01F 12/24 |
| 2018/0009305 A1 * | 1/2018 | Nelson | F02M 35/0216 |

FOREIGN PATENT DOCUMENTS

| | | |
|---|---|---|
| JP | H3108331 A | 11/1991 |
| JP | H6292443 A | 10/1994 |
| JP | 201363022 A | 4/2013 |
| JP | 2013183717 | 9/2013 |

\* cited by examiner

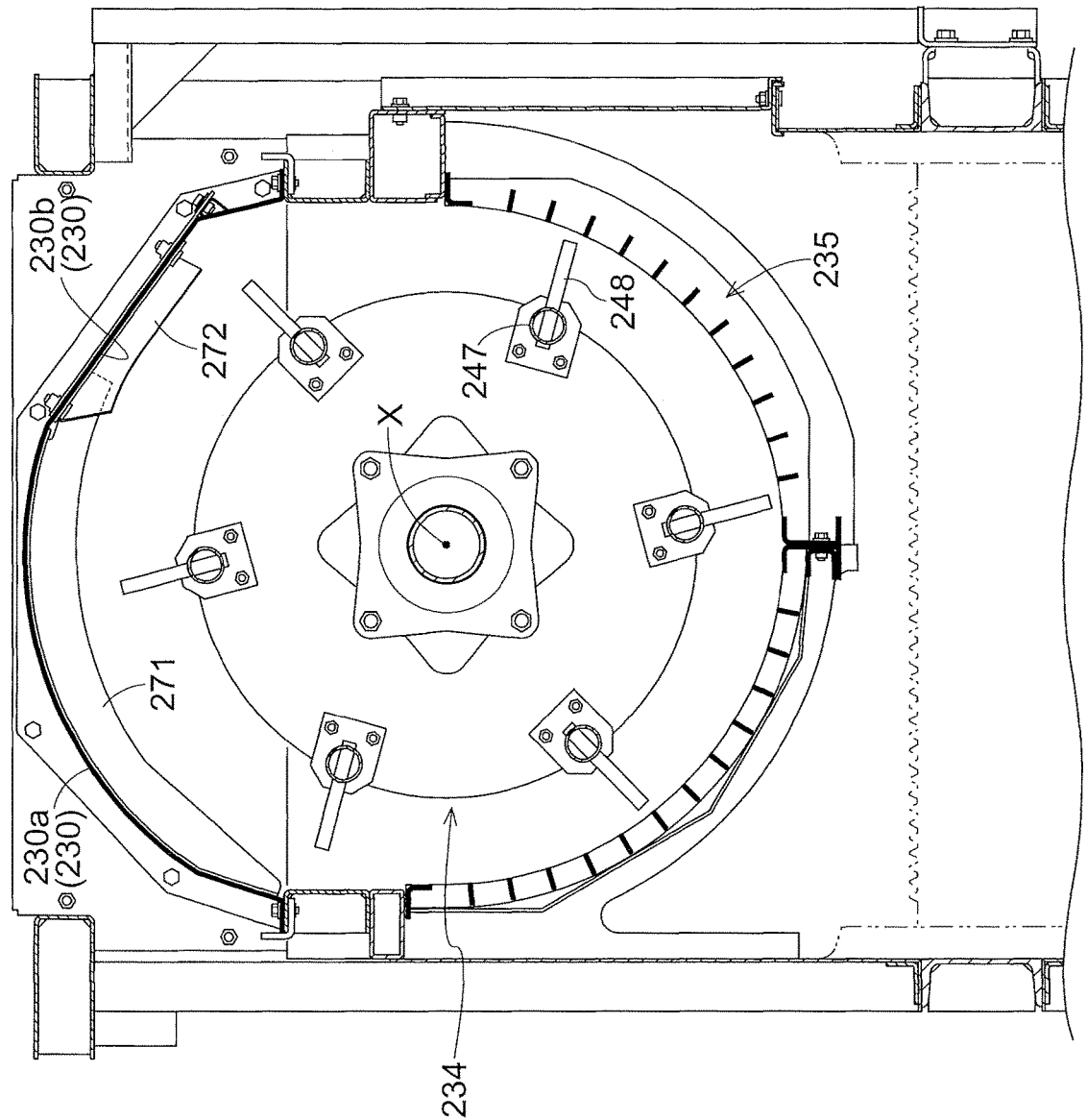

COMBINE HARVESTER WITH A THRESHING DEVICE AND DETACHABLE TOP PLATE

CROSS-REFERENCE TO RELATED APPLICATIONS

This application is the United States national phase of International Application No. PCT/JP2019/029841 filed Jul. 30, 2019, and claims priority to Japanese Patent Application Nos. 2018-142735 filed Jul. 30, 2018, 2018-142736 filed Jul. 30, 2018, and 2018-142737 filed Jul. 30, 2018, the disclosures of which are hereby incorporated by reference in their entirety.

BACKGROUND OF THE INVENTION

Field of the Invention

The present invention relates to a combine harvester.

Description of Related Art (1) Conventionally, there are combine harvesters provided with threshing devices that perform a threshing process of threshing reaped grain culm.

As described in JP 2013-183717A (Patent Document 1), for example, in order to inspect and clean a threshing device, some conventional combine harvesters are provided with a top plate that covers an upper portion of a threshing chamber and that is swingable and openable upward around a front-rear axis on one end side in the lateral direction. The combine harvester disclosed in Patent Document 1 is provided with a grain tank in which grain obtained through a threshing process is stored, in a state in which the grain tank is located above the threshing device.

(2) Conventionally, there are combine harvesters that are provided with threshing devices that perform a threshing process of threshing reaped grain culm in a threshing chamber, and are provided with, on an inner side of the top plates covering the upper portions of the threshing chamber, a plurality of dust transfer valves configured to transfer threshed articles from one side toward the other side located in a rotation axial direction of a threshing cylinder.

As described in Patent Document 1, for example, some conventional combine harvesters are configured to be attachable to an inner surface of a top plate in a state in which the positions of all of the plurality of dust transfer valves are fixed (referred to as a first conventional technique hereinafter). Also, as described in JP H06-292443A (Patent Document 2), some conventional combine harvesters are configured such that all of the plurality of dust transfer valves are swingably supported on an inner surface of a top plate and the feed angle can be changed and adjusted (referred to as a second conventional technique hereinafter).

Patent Document 1: JP 2013-183717A
Patent Document 2: JP H06-292443A

SUMMARY OF THE INVENTION (1) A problem corresponding to the Background Art (1) is as follows.

As with the above-described conventional configuration, with a configuration in which the top plate is swung upward to open the threshing chamber outward, when maintenance work such as the inspection and cleaning of the threshing device is performed, a large space is required on the upper side in order to greatly swing the top plate upward. In particular, with a configuration in which a grain tank is provided above the threshing device, a mechanism for greatly opening the grain tank is required, which is disadvantageous because the structure thereof becomes complicated. Also, an operator needs to climb to a high portion thereof in order to swing the top plate, and it becomes disadvantageous for an operator to perform operations.

In view of this, there is demand for easily performing maintenance work inside of the threshing chamber without complicating the structure thereof.

(2) Another problem corresponding to the Background Art (2) is as follows.

Because the positions of the plurality of dust transfer valves are fixed in the above-described first conventional technology, the shape of the top plate can be formed in an arc shape to regulate the rotation of an outer end portion of the threshing cylinder. However, with this configuration, the feed angle of the dust transfer valves for transferring threshed articles is fixed. Thus, if the amount of crops carried in the threshing device increases, there is a risk that processed articles may be clogged due to insufficient transport processing capacity in the rotation axis direction of the threshing cylinder, and be transferred rearward without grain removal, for example, and if the amount of crops decreases, there is a risk that the threshed articles may be transferred too fast, and be transferred rearward without grain removal, resulting in a decrease in grain removal performance.

With the above-described second conventional technology, regardless of a change in the amount of crops, the threshed articles can be smoothly transferred by adjusting the feed angle of the dust transfer valves in accordance with a change in the amount of crops carried in the threshing device. However, with this configuration, portions of the top plate on which the dust transfer valves are mounted in order to change the feed angle of the dust transfer valves need to be a flat surface, and thus there is a risk that the threshed articles to be carried around and transferred as the threshing cylinder rotates cannot be smoothly transferred.

In view of this, there is demand for maintaining appropriate grain removal performance according to a difference in the amount of crops that are carried in the threshing device while smoothly transferring the threshed articles that are carried around as the threshing cylinder rotates.

(1) A first solution corresponding to Problem (1) is as follows.

In a characteristic configuration of a combine harvester according to the present invention, the combine harvester includes: a threshing device configured to perform a threshing process of threshing reaped grain culm in a threshing chamber, in which the threshing chamber includes a threshing cylinder configured to rotate around a front-rear axis, and an arc-shaped receiving net provided extending along an outer circumferential portion of the threshing cylinder, and a top plate covering an upper portion of the threshing chamber is supported detachably along a rotation axis direction of the threshing cylinder.

According to the present invention, maintenance work such as inspection and cleaning of the inside of the threshing chamber can be performed by detaching the top plate covering the upper portion of the threshing chamber along the rotation axis direction of the threshing cylinder. With this configuration, an operator can perform operations at a low position on the lateral side of the vehicle body without climbing to a high position as in a case where the top plate is swung upward. Also, even if the grain tank is arranged above the threshing device, for example, the grain tank does not need to have a specific evacuation structure in order to open the top plate, thus simplifying the support structure thereof.

Therefore, it is possible to easily perform maintenance work inside of the threshing chamber without complicating the structure thereof.

In the present invention, it is suitable that the top plate is constituted by a plurality of dividing top plates that are divided along the rotation axis direction.

According to this configuration, the dividing top plates that are divided are smaller and lighter in weight than the entire top plate, and thus the labor burden of attachment and detachment can be reduced.

In the present invention, it is suitable that the threshing cylinder is provided with a raking unit that is located on one end side in the rotation axis direction and that is configured to rake reaped grain culm, and a threshing unit that is located on another end side of the raking unit in the rotation axis direction and that is configured to thresh the reaped grain culm, and a portion of the top plate that corresponds to the threshing unit is detachable along the rotation axis direction, and a portion of the top plate that corresponds to the raking unit is provided in a positionally fixed state.

According to this configuration, in the threshing unit of the threshing cylinder, the outer circumferential portion of the threshing cylinder is provided with threshing teeth for a threshing process, and reaped grain culm is threshed between the receiving net and the threshing teeth. In this region, a space between the threshing cylinder and the top plate is narrow in order to favorably perform a threshing process. As a result, if a threshing process is repeated, the top plate is likely to wear due to a contact with the threshing unit. In contrast, in the raking unit of the threshing cylinder, the outer circumferential portion of the threshing cylinder is provided with a spiral blade or the like in order to rake the reaped grain culm that is carried in from a threshing inlet to the rear side, for example. In this region, the reaped grain culm is just transferred by the spiral blade or the like, and the top plate is less likely to wear as much as in the threshing unit.

In view of this, by detaching only a portion corresponding to the threshing unit, it is possible to efficiently perform maintenance work such as repair and replacement on the portion that is likely to wear.

In the present invention, it is suitable that the threshing device is provided with side wall portions that define left and right sides thereof, upper end portions of the left and right side wall portions are provided with side wall upper end frames that extend along the rotation axis direction, and the top plate is placed on and supported by the side wall upper end frames on both left and right sides to be movable in the rotation axis direction.

According to this configuration, because the top plate is placed on and supported by the side wall upper end frames on both left and right sides that extend in the rotation axis direction, the top plate can be moved along the rotation axis direction in a state in which the top plate is stably supported.

In the present invention, it is suitable that support portions of the left and right side wall upper end frames that support the top plate are provided with a detachment prevention guide having a vertically oriented surface.

According to this configuration, when the top plate is moved, it is possible to avoid positional shift outward in the lateral direction due to the detachment prevention guide, and to smoothly move the top plate along the rotation axis direction in a state in which the orientation thereof does not change.

In the present invention, it is suitable that either one of the top plate and the side wall upper end frames is provided with a rolling element configured to roll in contact with the other one of the top plate and the side wall upper end frames.

According to this configuration, the top plate can be smoothly moved due to the rolling element provided in either one of the top plate and the side wall upper end frames rolling in contact with the other one of the top plate and the side wall upper end frames.

In the present invention, it is suitable that either one of the top plate and the side wall upper end frames is provided with a slip promoting body capable of facilitating sliding movement.

According to this configuration, when the top plate and the side wall upper end frames move relative to each other as the top plate moves in a state in which the top plate and the side wall upper end frames are in contact with each other, sliding movement is facilitated because of the slip promoting body provided in either one of the top plate and the side wall upper end frames. As a result, the top plate can be smoothly moved.

In the present invention, it is suitable that a grain tank for storing grain obtained after being subjected to a grain removal process performed by the threshing device and an engine serving as a power source are provided above the threshing device, two side portions in a lateral direction of the threshing device are provided with upper frames that are supported by a vehicle body frame and extend in the rotation axis direction, and the grain tank and the engine are supported by the left and right upper frames.

According to this configuration, the grain tank and the engine are provided above the threshing device. Even if the size of the threshing device is increased in order to increase the threshing process capacity, for example, it is possible to inhibit an increase in the lateral dimensions of the overall vehicle body, compared to a case where the grain tank and the engine are provided on the lateral side of the threshing device. Also, the grain tank and the engine located at high positions above the threshing device can be favorably supported by the left and right upper frames that are stably supported by the vehicle body frame.

Also, a second solution corresponding to Problem (1) is as follows.

In a characteristic configuration of a combine harvester according to the present invention, the combine harvester includes: a threshing device configured to perform a threshing process of threshing reaped grain culm in a threshing chamber, in which the threshing chamber includes a threshing cylinder configured to rotate around a front-rear axis, and an arc-shaped receiving net provided extending along an outer circumferential portion of the threshing cylinder, and a top plate covering an upper portion of the threshing chamber is supported detachably along a lateral direction.

According to the present invention, maintenance work such as inspection and cleaning of the inside of the threshing chamber can be performed by detaching the top plate covering the upper portion of the threshing chamber along the lateral direction. With this configuration, an operator can perform operations at a low position on the lateral side of the vehicle body without climbing to a high position as in a case where the top plate is swung upward. Also, even if the grain tank is arranged above the threshing device, for example, the grain tank does not need to have a specific evacuation structure in order to open the top plate, thus simplifying the support structure thereof.

Therefore, it is possible to easily perform maintenance work inside of the threshing chamber without complicating the structure thereof.

In the present invention, it is suitable that the top plate is constituted by a plurality of dividing top plates that are divided along a rotation axis direction of the threshing cylinder, the plurality of dividing top plates are individually detachable along the lateral direction, and a division border portion between the plurality of dividing top plates is provided with a support frame that extends from one side portion to another side portion located in the lateral direction of the threshing device, and the plurality of dividing top plates are supported by the support frame.

According to this configuration, the dividing top plates that are divided are smaller and lighter in weight than the entire top plate, and thus the labor burden of attachment and detachment can be reduced. The support frame for supporting the plurality of dividing top plates extends from one side portion to the other side portion located in the lateral direction at the division border portion, and thus the support frame does not hinder attachment and detachment of a dividing top plate along the lateral direction, and a dividing plate can be easily attached to and removed from the support frame.

In the present invention, it is suitable that the plurality of dividing top plates are each constituted by a plurality of top plate constituent bodies that are separated along a circumferential direction of the threshing cylinder, the top plate constituent body located on one side in the lateral direction is supported by the support frame detachably from the one side in the lateral direction, and the top plate constituent body located on another side in the lateral direction is supported by a rail portion provided on the support frame such that the top plate constituent body is removable and insertable along the lateral direction.

According to this configuration, the dividing top plate is further divided along the circumferential direction, and thus the weight thereof can be further reduced, and the labor burden of attachment and detachment can be reduced. The top plate constituent body located on one side in the lateral direction is located at a position close to an operator located outward of the one side in the lateral direction of the vehicle body, and thus can directly be detached therefrom. The top plate constituent body located on the other side in the lateral direction, in other words, on the inner back side, is supported by the rail portion, and can be removed or inserted along the lateral direction, and thus an operator located outward of the one side in the lateral direction of the vehicle body can reach out, remove, and insert the top plate constituent body. After the operator inserts and mounts the top plate constituent body, the top plate constituent body can be stably supported by the support frame via the rail portion.

In the present invention, it is suitable that a grain tank for storing grain obtained after being subjected to a grain removal process performed by the threshing device and an engine serving as a power source are provided above the threshing device, two side portions in a lateral direction of the threshing device are provided with upper frames that extend in the rotation axis direction across upper portions of a plurality of the support frames, and the grain tank and the engine are supported by the left and right upper frames.

According to this configuration, the grain tank and the engine are provided above the threshing device. Even if the size of the threshing device is increased in order to increase the threshing process capacity, for example, it is possible to inhibit an increase in the lateral dimensions of the overall vehicle body, compared to a case where the grain tank and the engine are provided on the lateral side of the threshing device. Also, the left and right upper frames can be stably supported using the plurality of support frames provided to divide the top plate, and the grain tank and the engine located at high positions above the threshing device can be favorably supported by such left and right upper frames.

In the present invention, it is suitable that the receiving net is constituted by a plurality of dividing receiving nets that are divided along a rotation axis direction of the threshing cylinder, a side wall of the threshing device is constituted by a plurality of dividing walls that are divided along the rotation axis direction, and the dividing receiving nets and the dividing walls are supported detachably along the lateral direction.

According to this configuration, the receiving wall and the side wall are divided, and thus not only the size and the weight of the top plate but also the size and weight of the receiving net and the side wall can be reduced, and thus the labor burden of attachment and detachment can be reduced.

In the present invention, it is suitable that the top plate is constituted by a plurality of dividing top plates that are divided along the rotation axis direction, the dividing receiving net and the dividing wall are divided along the rotation axis direction at the same positions as where the top plate is divided, and are detachable in the same direction as the top plate.

According to this configuration, because the dividing top plate, the dividing receiving net, and the dividing wall are divided at the same positions, the attachment and detachment thereof can be efficiently performed without trouble. As a result, it is possible to more easily perform maintenance work inside of the threshing chamber.

In the present invention, it is suitable that the threshing chamber is provided, on an inner side of the top plate, with a plurality of dust transfer valves configured to transfer threshed articles from one side toward another side located in the rotation axis direction of the threshing cylinder at intervals along the rotation axis direction of the threshing cylinder, and the plurality of dust transfer valves each includes a fixed dust transfer valve portion attached to the top plate in a positionally fixed state, and a movable dust transfer valve portion that is adjacent to the fixed dust transfer valve portion in a circumferential direction and is capable of changing and adjusting a feed angle through swinging.

According to this configuration, the fixed dust transfer valve portion of the dust transfer valve is attached to the top plate in a positionally fixed state, and thus the fixed dust transfer valve portion is not restricted by the shape of the top plate. In view of this, as the shape of the top plate, a portion to which the fixed dust transfer valve portion may be attached can have a shape such that threshed articles can be smoothly carried around as the threshing cylinder rotates. Also, the transport processing capacity along the rotation axis direction of the threshing cylinder can be changed by changing the feed angle of the movable dust transfer valve portion that is adjacent in the circumferential direction to the fixed dust transfer valve portion of the dust transfer valve.

As a result, regardless of a change in the amount of crops, the disadvantage of a reduction in the grain removal performance can be easily eliminated by adjusting, with use of the movable dust transfer valve portion, the feed angle of the dust transfer valves in accordance with a change in the amount of crops that are carried in the threshing device, while the threshed articles are smoothly transferred by the fixed dust transfer valve portion as the threshing cylinder rotates.

(2) A solution corresponding to Problem (2) is as follows.

In a characteristic configuration of a combine harvester according to the present invention, the combine harvester includes: a threshing device configured to perform a threshing process of threshing reaped grain culm in a threshing chamber, in which the threshing chamber includes a threshing cylinder configured to rotate around a front-rear axis, an arc-shaped receiving net provided extending along an outer circumferential portion of the threshing cylinder, and a plurality of dust transfer valves that are provided on an inner surface side of a top plate covering an upper portion of the threshing chamber at intervals along a rotation axis direction of the threshing cylinder, and that are configured to transfer the threshed articles from one side toward another side located in the rotation axis direction of the threshing cylinder, the plurality of dust transfer valves each include a fixed dust transfer valve portion attached to the top plate in a positionally fixed state and a movable dust transfer valve portion that is adjacent to the fixed dust transfer valve portion in a circumferential direction and is capable of changing and adjusting a feed angle through swinging.

According to this configuration, the fixed dust transfer valve portion of the dust transfer valve is attached to the top plate in a positionally fixed state, and thus the fixed dust transfer valve portion is not restricted by the shape of the top plate. In view of this, as the shape of the top plate, a portion to which the fixed dust transfer valve portion may be attached can have a shape such that threshed articles can be smoothly carried around as the threshing cylinder rotates. Also, the transport processing capacity along the rotation axis direction of the threshing cylinder can be changed by changing the feed angle of the movable dust transfer valve portion that is adjacent in the circumferential direction to the fixed dust transfer valve portion of the dust transfer valve.

As a result, regardless of a change in the amount of crops, the disadvantage of a reduction in the grain removal performance can be easily eliminated by adjusting, with use of the movable dust transfer valve portion, the feed angle of the dust transfer valves in accordance with a change in the amount of crops that are carried in the threshing device, while the threshed articles are smoothly transferred by the fixed dust transfer valve portion as the threshing cylinder rotates.

Thus, it is possible to maintain appropriate grain removal performance according to a difference in the amount of crops that are carried in the threshing device while smoothly transferring the threshed articles that are carried around as the threshing cylinder rotates.

In the present invention, it is suitable that the fixed dust transfer valve portion and the movable dust transfer valve portion overlap with each other in the circumferential direction in a state in which one of the fixed dust transfer valve portion and the movable dust transfer valve portion that is located on an upper side in the direction of rotation of the threshing cylinder is located on a lower side in a processed article transfer direction.

According to this configuration, the dust transfer valve portion out of the fixed dust transfer valve portion and the movable dust transfer valve portion that is located on the upper side in the direction of rotation of the threshing cylinder comes into contact with threshed articles faster than the dust transfer valve portion located on the lower side, and functions to feed threshed articles. Also, the dust transfer valve portion located on the upper side in the rotation direction is located on the lower side in the processed article transfer direction, and overlaps the dust transfer valve portion located on the lower side in the processed article transfer direction, and thus, the threshed articles that are to be guided and transferred thereby can be smoothly transferred without being caught and remaining on a step portion with the dust transfer valve portion located on the upper side in the processed article transfer direction.

In the present invention, it is suitable that the fixed dust transfer valve portion is located on the upper side in the rotation direction and the movable dust transfer valve portion is located on the lower side in the rotation direction, and the movable dust transfer valve portion is capable of changing and adjusting the feed angle due to the movable dust transfer valve portion pivoting around a pivot fulcrum located at an end portion located on the upper side in the rotation direction.

According to this configuration, the movable dust transfer valve portion overlaps the fixed dust transfer valve portion in the circumferential direction in a state in which the movable dust transfer valve portion is located on the lower side in the rotation direction, and on the upper side in the processed article transfer direction with respect to the fixed dust transfer valve portion. Also, the movable dust transfer valve portion swings around the pivot fulcrum provided at the overlapping portion. The pivot fulcrum is located on a side opposite to the side coming into contact with the threshed articles, and thus the threshed articles are smoothly transferred in a state in which no threshed articles come into contact with the pivot fulcrum.

In the present invention, it is suitable that a fixed side corresponding portion of the top plate located on the fixed dust transfer valve portion side is formed in an arc shape along the circumferential direction, a movable side corresponding portion of the top plate located on the movable dust transfer valve portion side is formed in a flat plate shape, and the fixed side corresponding portion is longer than the movable side corresponding portion in the circumferential direction.

According to this configuration, the fixed side corresponding portion of the top plate is formed in an arc shape, and is longer than the movable side corresponding portion along the circumferential direction, and thus threshed articles can be smoothly carried around as the threshing cylinder rotates over a long range. On the other hand, because the movable side corresponding portion is formed in a flat plate shape, the feed angle of the movable dust transfer valve portion can be smoothly adjusted.

In the present invention, it is suitable that the fixed dust transfer valve portion extends beyond the fixed side corresponding portion toward the movable side corresponding portion along the circumferential direction.

According to this configuration, because the fixed dust transfer valve portion extends beyond the arc-shaped fixed side corresponding portion toward the flat plate-shaped movable side corresponding portion, the threshed articles are smoothly transferred by the fixed dust transfer valve portion up to a position corresponding to the movable side corresponding portion. As a result, it is possible to avoid hindrance of the transfer of the threshed articles at a portion where the top plate changes from an arc shape to a flat plate shape, and to smoothly transfer the threshed articles.

In the present invention, it is suitable that the top plate is provided with the fixed side corresponding portion and the movable side corresponding portion in a dividing manner.

According to this configuration, the arc-shaped fixed side corresponding portion and the flat plate-shaped movable side corresponding portion can be separately produced, and the size and weight of each member are reduced, and each member can be easily handled. Also, because the top plate overall is constituted by small members instead of a large member, and thus the top plate can be easily removed in maintenance work of the threshing chamber.

In the present invention, it is suitable that the top plate is formed as a single body in a state in which the fixed side corresponding portion and the movable side corresponding portion are continuous with each other.

According to this configuration, as a result of forming a fixed side corresponding portion and a movable side corresponding portion as a single body when a top plate is produced, the labor of the production and costs can be reduced.

BRIEF DESCRIPTION OF THE DRAWINGS

FIG. 23 is a vertical cross-sectional front view of a threshing device of another embodiment.

DETAILED DESCRIPTION OF THE INVENTION

First Embodiment

First, a first embodiment will be described below with reference to FIGS. 1 to 10.

Below, with reference to the accompanying drawings, an example will be described in which an embodiment of a combine harvester according to the present invention is applied to an ordinary combine harvester.

Figure 1:
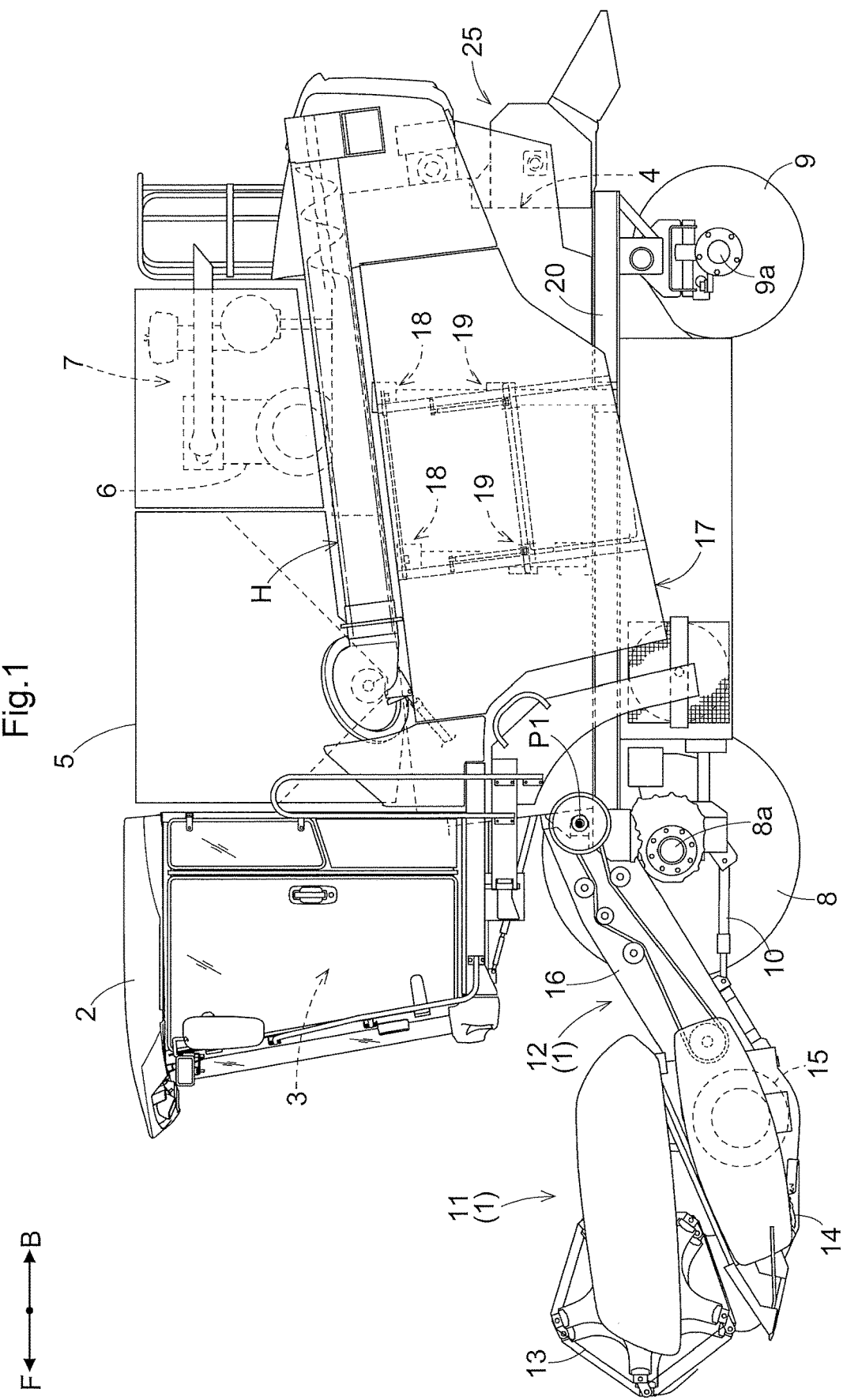
FIG. 1 is an overall side view of a combine harvester, showing a first embodiment (the same applies to FIG. 2 to FIG. 10 hereinafter).
Figure 2:
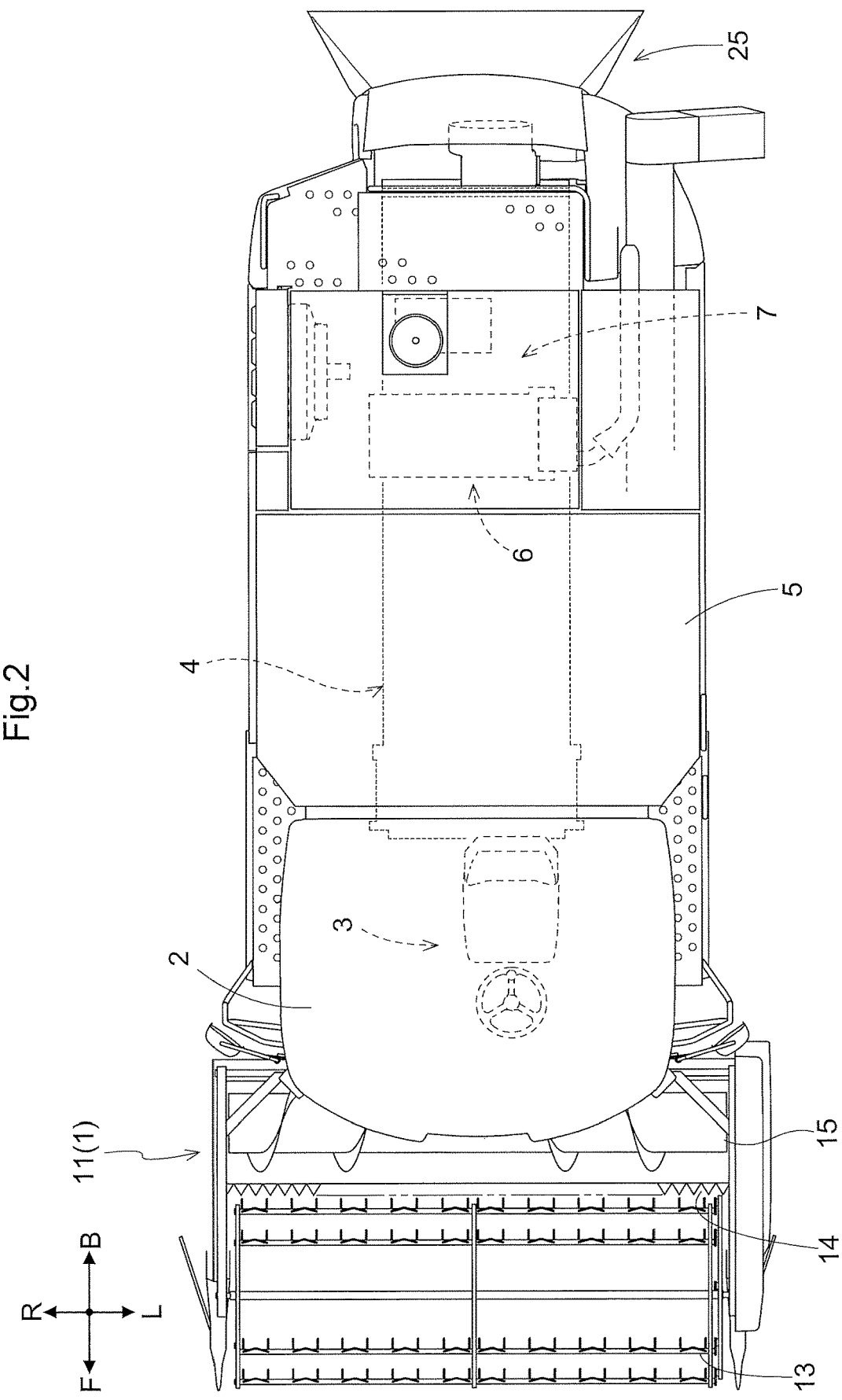
FIG. 2 is an overall plan view of the combine harvester.

Overall Configuration:

As shown in FIGS. 1 and 2, the combine harvester is provided with a reaping transport unit 1 that reaps a crop and transports it rearward, a driving portion 3 covered with a cabin 2, a threshing device 4 that performs a threshing process of threshing articles reaped by the reaping transport unit 1, a grain tank 5 that stores grain obtained by the threshing process performed by the threshing device 4, a motor 7 having an engine 6 as a power source, a pair of left and right front wheels 8 that cannot be steered and are rotationally driven, a pair of left and right rear wheels 9 that can be steered, and the like. A screw conveyor type grain discharge device H for transporting stored grain to the outside of the vehicle body is provided on the left side of the grain tank 5.

In this embodiment, when defining the front-rear direction of the vehicle body, this direction is defined along the vehicle body traveling direction in a working state, and when defining the left right direction of the vehicle body, left and right are defined as viewed from the vehicle body traveling direction. That is, the direction indicated by reference sign (F) in FIGS. 1 and 2 is the front side of the vehicle body, and the direction indicated by reference sign (B) in FIGS. 1 and 2 is the rear side of the vehicle body. The direction indicated by reference sign (L) in FIG. 2 is the left side of the vehicle body, and the direction indicated by reference sign (R) in FIG. 2 is the right side of the vehicle body.

The reaping transport unit 1 is supported by a reaping elevating cylinder 10 as an elevating actuator at the front portion of the vehicle body so as to be able to be driven up and down around a laterally oriented fulcrum P1. The reaping transport unit 1 is provided with a reaping header 11 that reaps a crop to be planted, and gathers the reaped crop in the center in a cutting width direction, and a feeder 12 that transports the reaped and centrally gathered crop to the threshing device 4 at the rear of the vehicle body.

The reaping header 11 has a rotating reel 13 that rakes the tip side of a crop to be reaped rearward, a clipper-type cutting blade 14 that cuts and reaps the root of the crop, and a lateral feed auger 15 that gathers the reaped crop toward the center in the cutting width direction, and the like.

Although not shown, the feeder 12 includes a tubular transport case 16 in which endless rotating chains are wound and stretched across front and rear wheel bodies, a transport conveyor is provided with a locking carrier across the endless rotating chains, and the transport conveyor is configured to transport the crop delivered from the reaping header 11 upward and rearward.

The threshing device 4 is located at a low position in the center of the vehicle body in the left-right direction, and the grain tank 5 that stores grain obtained after being subjected to a grain removal process performed by the threshing device 4, and an engine 6 serving as a power source are provided above the threshing device 4. Specifically, in a state in which the grain tank 5 is located on the front side of the vehicle body and the engine 6 is located on the rear side of the vehicle body, the grain tank 5 and the engine 6 are arranged side-by-side in the front-rear direction. The left and right outer sides of the threshing device 4 are covered by the outer cover 17.

Although not described in detail, the outer cover 17 is configured such that an upper portion of the outer cover is supported by a pivotal portion 18 extending along the front-rear direction so as to be swingable and openable, and the position of the outer cover 17 can be held in a closed state by an engagement locking mechanism 19 that can be released through manual operation.

Figure 3:
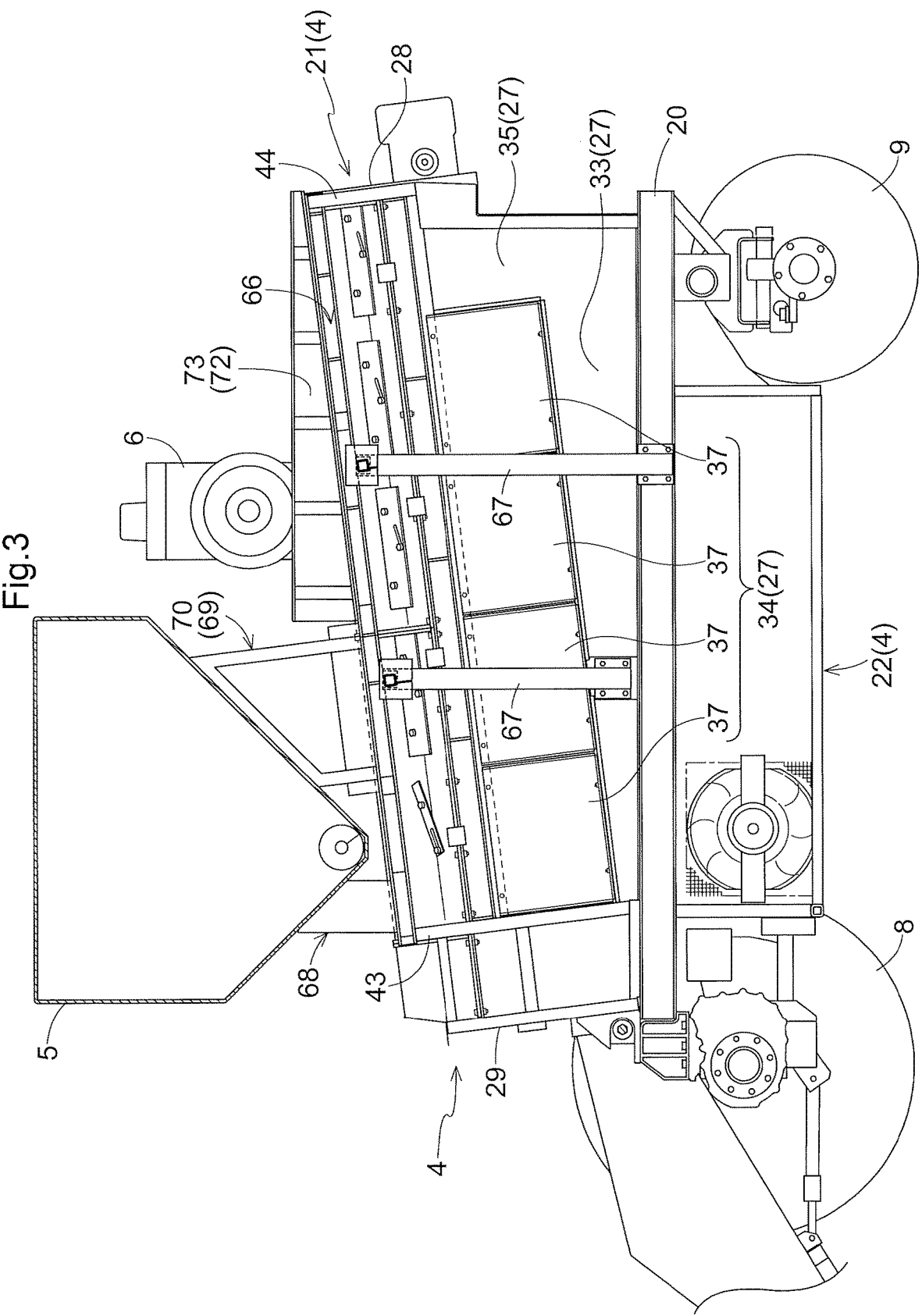
FIG. 3 is side view showing a support structure of a threshing device.
Figure 4:
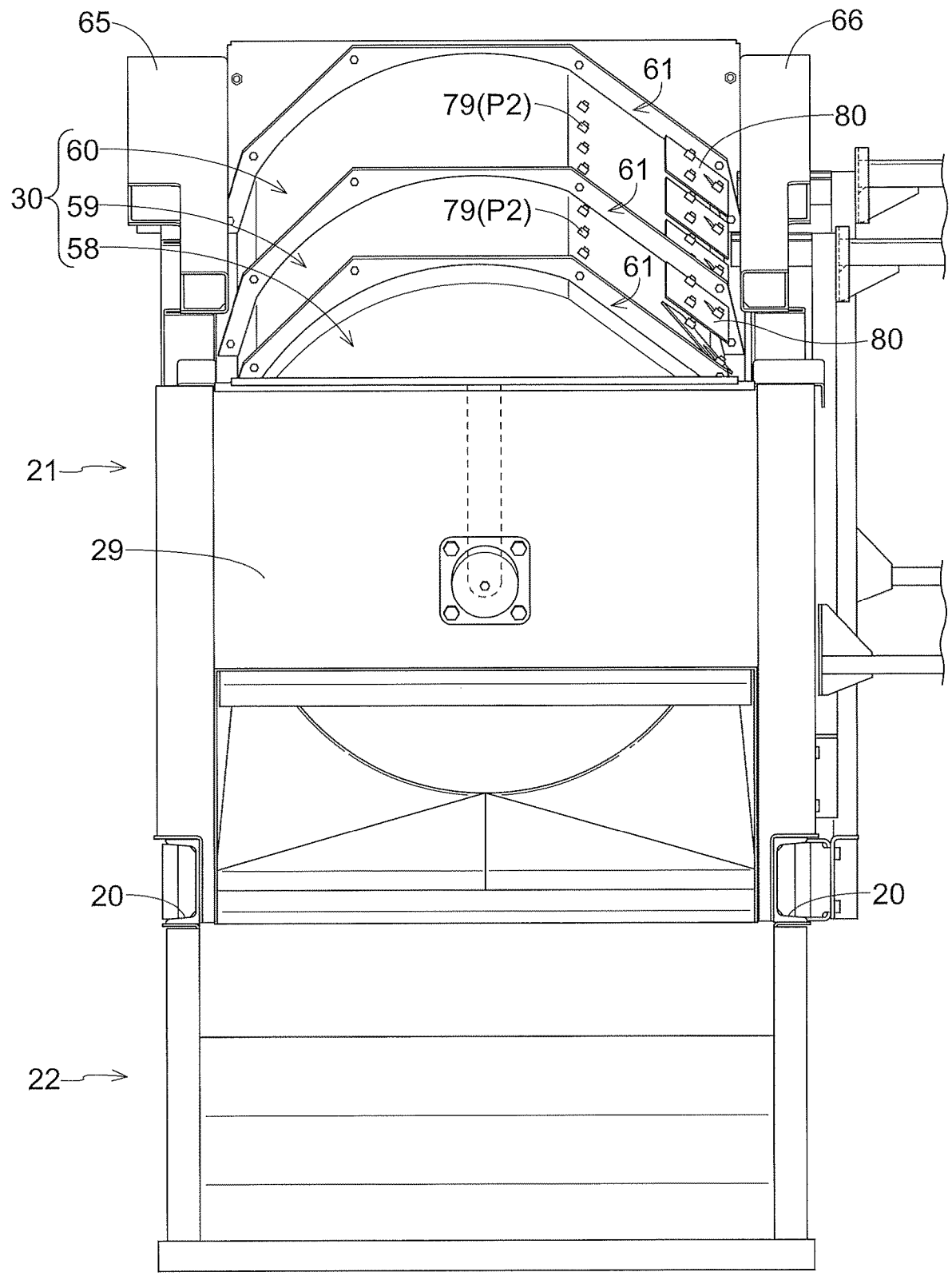
FIG. 4 is a front view of the threshing device.

As shown in FIGS. 1 and 3, a pair of left and right main frames 20 extending in the front-rear direction of the vehicle body are provided below the vehicle body. The left and right main frames 20 support the entire vehicle, and the main frames 20 correspond to a vehicle body frame.

The left and right main frames 20 are formed of a channel material having a substantially C-shaped cross-section, and are provided long in the front-rear direction from the vehicle body front portion to the vehicle body rear portion. Axles 8a and 9a of the left and right front wheels 8 and the left and right rear wheels 9 are provided at positions lower than the left and right main frames 20. The left and right front wheels 8 and the left and right rear wheels 9 are provided in a state positioned on the outer side of the vehicle body in the left-right direction of each of the left and right main frames 20, and the left and right main frames 20 are supported by the left and right front wheels 8 and the left and right rear wheels 9.

Threshing Device:

Following is a description of the threshing device 4.

Figure 5:
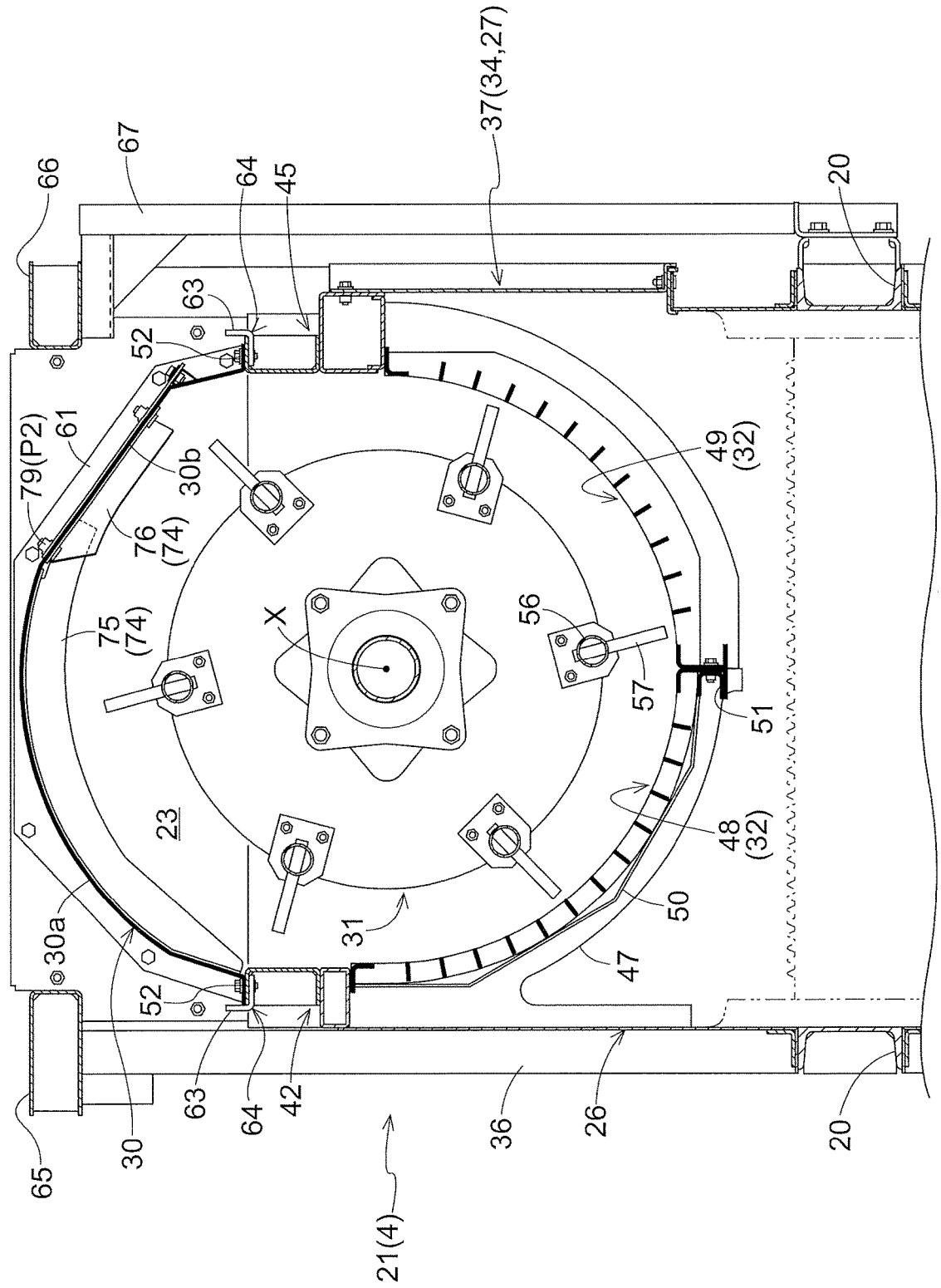
FIG. 5 is a vertical cross-sectional front view of the threshing device.
Figure 6:
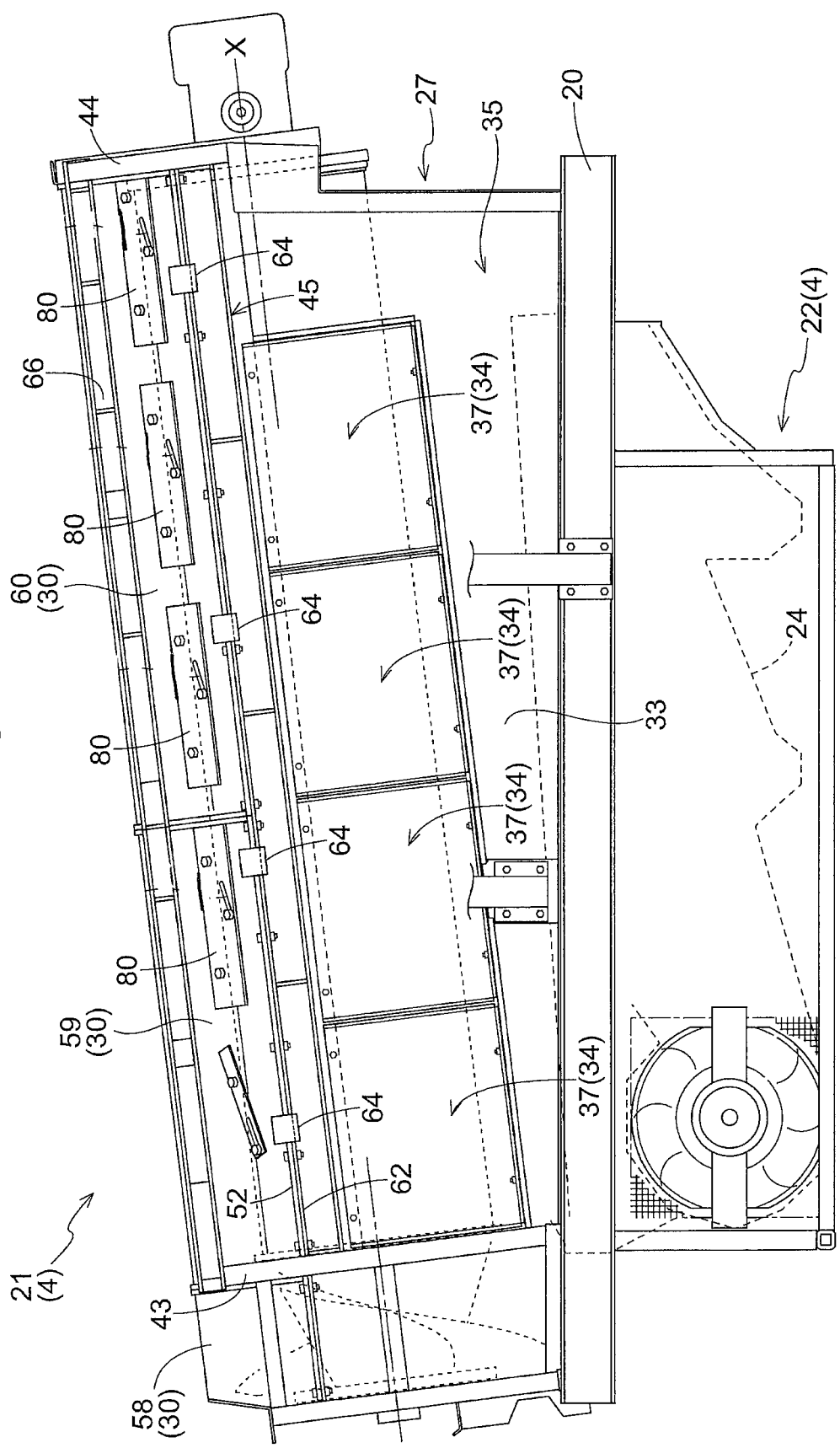
FIG. 6 is a left side view of the threshing device.
Figure 7:
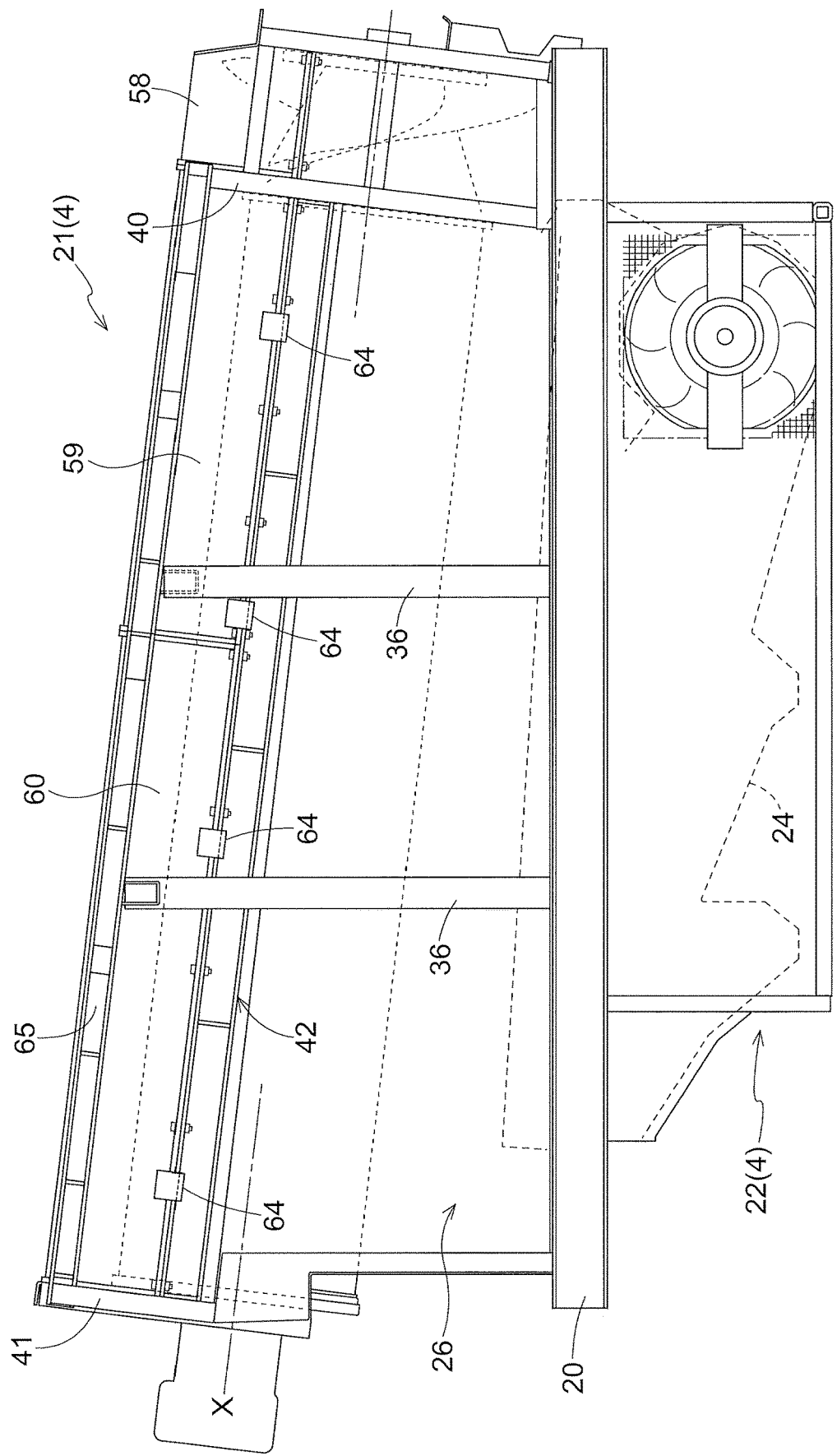
FIG. 7 is a right side view of the threshing device.

As shown in FIGS. 5, 6, and 7, the threshing apparatus 4 includes a threshing unit 21 that performs a grain removal process, and a sorting unit 22 that performs a sorting process of sorting processed articles after the grain removal process has been performed by the threshing unit 21.

A threshing chamber 23 where reaped grain culm is threshed is formed in the threshing unit 21. Although not described in detail, the sorting unit 22 is provided with a sorting processing unit 24 that, while shaking the processed articles after the grain removal process has been performed and transferring the articles into the internal space surrounded by a wall portion, sorts these articles into grain, secondary products such as branch-attached grain, waste straw and the like. As shown in FIG. 1, a shredding device 25 that shreds the threshed material (waste straw and the like) obtained after being subjected to a threshing process in the threshing device 4 is provided on the vehicle body rear side of the threshing device 4.

The threshing unit 21 is placed on and supported by the left and right main frames 20. The threshing unit 21 has a configuration in which the threshing unit 21 is surrounded by plate-shaped left and right side wall portions 26 and 27 serving as left and right vertically oriented support portions extending in the vertical direction, a substantially plate-shaped rear wall portion 28 connecting the rear end portions of the left and right side wall portions 26 and 27, a substantially plate-shaped front wall portion 29 connecting the front end portions of the left and right side wall portions 26 and 27, a top plate 30 that extends across the left and right side wall portions 26 and 27 and covers the upper portions thereof, and the like. The front wall portion 29 and the rear wall portion 28 are provided with openings through which threshed articles pass.

The threshing unit 21 is configured such that the front side of the vehicle body is narrow in the vertical direction and the width on the rear side of the vehicle body increases in the vertical direction. Also, the low end portion thereof is placed on the main frames 20 extending in a substantially horizontal posture along the front-rear direction. Therefore, the upper end portion of the threshing unit 21 has a rearwardly and upwardly inclined posture that is located higher toward the rear side.

As shown in FIG. 5, the threshing chamber 23 is provided with the threshing cylinder 31 that rotates around an axis X extending along the front-rear direction of the vehicle body, and is provided with, below the threshing cylinder 31, the receiving net 32 that is formed in a substantially arc shape in a front view to extend along the outer circumferential portion of the threshing cylinder 31. Reaped grain culm is introduced into the threshing chamber 23 from the front side of the vehicle body, and a threshing process (grain removal process) is performed by the threshing cylinder 31 and the receiving net 32. The threshing cylinder 31 is provided in a rearwardly inclined posture to have an oblique posture in which the rotation axis X becomes gradually higher toward the rear side of the vehicle body. Similarly to the threshing cylinder 31, the receiving net 32 is also provided in a rearwardly and upwardly inclined posture in a side view.

As shown in FIG. 7, out of the left and right side wall portions 26 and 27, the right side wall portion 26 located on the right side has a continuous shape such that the width on the rear side of the vehicle body increases in the vertical direction. As shown in FIG. 6, the left side wall portion 27 located on the left side is provided with upper side wall portions 34 having substantially the same width along the front-rear direction, a rear side wall portion 35 that is located on the rear side of the vehicle body and is wide in the vertical direction, and a lower side wall portion 33 formed in a substantially triangular shape in a side view to be narrow in the vertical direction on the front side of the vehicle body, and be wide in the vertical direction on the rear side of the vehicle body.

The right side wall portion 26 has a wall surface covering the entire wall portion, and is provided with a pair of rectangular cylindrical vertical frames 36 at a center portion thereof located in the front-rear direction at intervals in the front-rear direction. The right side wall portion 26 is bolted to a main frame 20 in a state in which the lower end portion of the right side wall portion 26 is placed on the upper surface of the main frame 20.

The lower side wall portion 33 and the rear side wall portion 35 of the left side wall portion 27 are bolted to the upper surface of a main frame 20 in a state in which the lower end portions of the lower side wall portion 33 and the rear side wall portion 35 are placed on the upper surface of the main frame 20. The upper side wall portion 34 is divided into multiple portions (four portions) along the rotation axis direction of the threshing cylinder 31, and is constituted by four dividing walls 37. The upper and lower sides of the dividing walls 37 are bolted, and when a bolt connection is released, the dividing walls 37 can be removed outward of the lateral side.

As shown in FIG. 7, the front end portion of the right side wall portion 26 is provided with a vertically oriented front auxiliary frame 40. This vertically oriented front auxiliary frame 40 has a rectangular cylindrical shape, and extends upward from the main frame 20 in the vertical direction. The rear end portion of the right side wall portion 26 is provided with a vertically oriented rear auxiliary frame 41. This vertically oriented rear auxiliary frame 41 has a U-shaped cross-section, and extends in the vertical direction upward from an intermediate portion in the vertical direction of the right side wall portion 26. Also, a side wall upper end frame 42 is located on the upper end portion of the right side wall portion 26 and extends in the rotation axis direction of the threshing cylinder 31 across the vertically oriented front and rear auxiliary frames 40 and 41.

As shown in FIG. 6, similarly, the front end portion of the left side wall portion 27 is provided with a vertically oriented front auxiliary frame 43 having a rectangular cylindrical shape. This vertically oriented front auxiliary frame 43 extends upward from the main frames 20 in the vertical direction. The rear end portion of the left side wall portion 27 is provided with a vertically oriented rear auxiliary frame 44. This vertically oriented auxiliary frame 44 has a U-shaped cross-section, and extends upward from an upper portion of the rear side wall portion 35. A side wall upper end frame 45 is located on the upper end portion of the left side wall portion 27 and extends in the rotation axis direction of the threshing cylinder 31 across the vertically oriented front and rear auxiliary frames 43 and 44. The left and right side wall upper end frame 42 and 45 have a substantially U-shaped cross-section, and is long, extending from the front portion to the rear end portion of the threshing device 4.

Although not shown, the receiving net 32 is divided along the rotation axis direction of the threshing cylinder 31, and each dividing receiving net is supported detachably along the lateral direction. The receiving net 32 is divided at the same positions as the dividing wall 37 of the upper side wall portion 34 of the left side wall portion 27 is divided along the rotation axis direction of the threshing cylinder 31, and is detachable in the same direction, that is, toward the left side of the vehicle body.

As shown in FIG. 5, the receiving net 32 is constituted by two receiving net constituent bodies 48 and 49 that are separated along the circumferential direction of the threshing cylinder 31. The right receiving net constituent body 48 is received and guided by an arc-shaped guide member 50 attached to front and rear side surfaces of a partition member 47, and is supported in a state in which the right end portion thereof is pressed against the right side wall upper end frame 42. Also, the left end portion thereof is bolted to a relay bracket 51 provided at a portion where the left and right receiving net constituent bodies 48 and 49 are connected to each other. The right end portion of the left receiving net constituent body 49 is bolted to the relay bracket 51, and the left end portion thereof is bolted to the left side wall upper end frame 45. Also, the intermediate portion in the left-right direction is bolted to the partition member 47. The portion connected to the partition member 47 is fastened together with the receiving net constituent body that is adjacent thereto with the partition member 47 held therebetween.

Therefore, the left receiving net constituent body 49 can be removed outward on the left side by releasing the connection made by a plurality of bolts. The right receiving net constituent body 48 can be removed by removing the left receiving net constituent body 49 and releasing the bolt connection to the relay bracket 51.

Top Plate:

The top plate 30 is provided in a substantially arc shape in a front view to substantially conform to the locus of rotation of the outer end portion of the threshing cylinder 31. As shown in FIG. 5, a portion of the top plate 30 located on the right side has a smooth arc shape. A portion of the top plate 30 located on the left side has a flat plate shape. The top plate 30 is formed as a single body in a state continuous along the circumferential direction.

The left and right side end portions of the top plate 30 are provided with flange portions 52 bent outward in a substantially L-shape, and the left and right flange portions 52 are placed on and supported by the side wall upper end frames 42 and 45 on both left and right sides. Also, the flange portions 52 are bolted to the side wall upper end frames 42 and 45 at multiple positions spaced apart in the front-rear direction.

Figure 8:
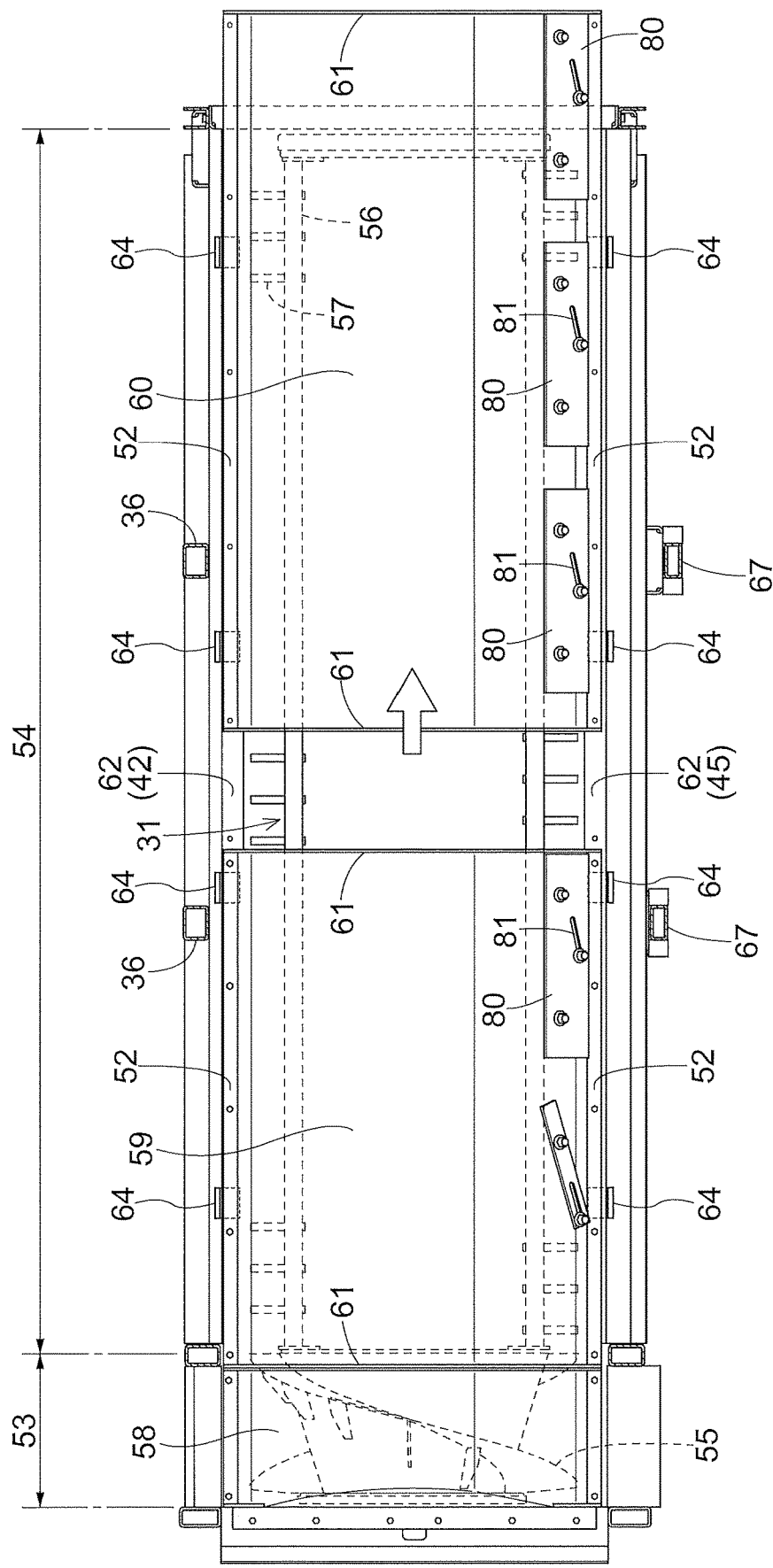
FIG. 8 is a plan view showing a state in which a top plate is moved.

As shown in FIGS. 6 and 8, the threshing cylinder 31 is provided with a raking unit 53 that is located on a front end side and rakes reaped grain culm, and a threshing unit 54 that is located on a rear side of the raking unit 53 and threshes the reaped grain culm. The raking unit 53 is configured to rake the reaped grain culm fed from the feeder 12 into the threshing chamber 23 by a spiral blade 55. The threshing unit 54 is provided with a plurality of rod-shaped members 56 that extend along the rotation axis direction at intervals in the circumferential direction, and a plurality of rod-shaped threshing teeth 57 that respectively protrude radially outward from the rod-shaped members 56.

A portion of the top plate 30 that corresponds to the threshing unit 54 is detachable along the rotation axis direction, and a portion of the top plate 30 that corresponds to the raking unit 53 is provided in a positionally fixed state. More specifically, the top plate 30 is configured such that the portion corresponding to the threshing unit 54 and the portion corresponding to the raking unit 53 are separated along the rotation axis direction. Also, the portion of the top plate 30 that corresponds to the threshing unit 54 is divided into two along the rotation axis direction. Therefore, the top plate 30 is divided into three along the direction of rotation of the threshing cylinder 31, and includes three dividing top plates 58, 59, and 60.

Out of the three dividing top plates 58, 59, and 60, the front dividing top plate 58 that is located on the frontmost side and corresponds to the raking unit 53 is provided in a positionally fixed state. Therefore, the front dividing top plate 58 cannot detach along the direction of rotation of the threshing cylinder 31. This is because the reaped grain culm is just transferred by the spiral blade 55 in the region corresponding to the raking unit 53, and thus the top plate 30 is less likely to wear like the threshing unit 54.

Out of the three dividing top plates 58, 59, and 60, two dividing top plates corresponding to the threshing unit 54, that is, the central dividing top plate 59 located at the center in the front-rear direction, and a rear dividing top plate 60 located on the rearmost member side are configured to be removable along the direction of rotation of the threshing cylinder 31 toward the vehicle body rear side. Both left and right side portions and both front and left end portions of the central dividing top plate 59 and the rear dividing top plate 60 are provided with connection flange portions 52 and 61, and the flange portions 52 of both left and right side portions are bolted to the side wall upper end frames 42 and 45. Also, the flange portions 61 of the front dividing top plate 58 and the central dividing top plate 59 are connected together along the front-rear direction, and the flanges of the central dividing top plate 59 and the rear dividing top plate 60 are also connected together along the front-rear direction in a similar manner.

As shown in FIGS. 5, 6, and 7, laterally oriented plate portions 62, which serve as support portions that support the top plate 30, of the side wall upper end frames 42 and 45 on both left and right sides are provided with detachment prevention guides 64 having vertically oriented surfaces 63. A plurality of the detachment prevention guides 64 are provided at appropriate intervals along the longitudinal direction of the side wall upper end frames 42 and 45. The detachment prevention guides 64 are each composed of a substantially L-shaped plate body in a front-rear view, and are attached to the laterally oriented plate portions 62 of the side wall upper end frames 42 and 45 such that the vertically oriented surfaces 63 are located in lateral end portions of the laterally oriented plate portions 62. The top plate 30 is guided by the left and right detachment prevention guides 64 attached to the side wall upper end frames 42 and 45 on both left and right sides such that the direction of the top plate 30 does not change in the lateral direction, and the top plate 30 can be smoothly moved rearward.

When the central dividing top plate 59 and the rear dividing top plate 60 are removed, first, the outer cover 17 is opened through swinging outward of the lateral side around the upper axis to open the lateral outer side of the threshing device 4. Then, the bolt connection of the central dividing top plate 59 and the rear dividing top plate 60 to the side wall upper end frames 42 and 45 in both left and right side portions is released from the lateral side of the vehicle body. Then, after the rear wall portion 28 of the threshing device 4 is removed, the rear dividing top plate 60 is removed rearward while sliding the upper surfaces of the side wall upper end frames 42 and 45 on both left and right sides (see FIG. 8). Then, the central dividing top plate 59 is removed rearward while the central dividing top plate 59 is slid. If the central dividing top plate 59 and the rear dividing top plate 60 are removed in this manner, the space above the threshing cylinder 31 is greatly opened, and thus maintenance work such as repair and inspection of the threshing cylinder 31 and removal of clogged waste straw can be easily performed from the outer rear side of the vehicle body or the outer lateral side of the vehicle body.

The threshing chamber 23 is provided with dust transfer valves 74 that are located on the inner side of the top plate 30 and are for transferring threshed articles from the front side of the vehicle body toward the rear side of the vehicle body. A plurality of dust transfer valves 74 are attached to the inner surface of the top plate 30, and extend in a substantially spiral shape in a state in which the dust transfer valves 74 are located on the outer circumferential side of the threshing cylinder 31. That is, the dust transfer valves 74 are provided to have a predetermined feed angle to transfer the threshed articles to the vehicle body rear side with respect to the rotation of the threshing teeth 57 such that the position of the threshing cylinder 31 changes to the vehicle body rear side as the position of the threshing cylinder 31 from the upper side in the circumferential direction toward the lower side changes.

The plurality of dust transfer valves 74 each include a fixed dust transfer valve portion 75 attached to the top plate 30 in a positionally fixed state, and a movable dust transfer valve portion 76 that is adjacent to the fixed dust transfer valve portion 75 in the circumferential direction and is capable of changing and adjusting a feed angle through swinging. As shown in FIG. 5, the fixed dust transfer valve portion 75 is located on the upper side in the rotation direction of the threshing cylinder 31, and the movable dust transfer valve portion 76 is located on the lower side in the rotation direction. Also, the fixed dust transfer valve portion 75 is located on the lower side in the processed article transfer direction with respect to the movable dust transfer valve portion 76, and the fixed dust transfer valve portion 75 and the movable dust transfer valve portion 76 overlap with each other along the circumferential direction.

As shown in FIG. 5, the fixed dust transfer valve portion 75 is attached to the inner surface of an arch-shaped portion 30a located on the right side of the top plate 30, and the movable dust transfer valve portion 76 is attached to the inner surface of a flat plate-shaped portion 30b located on the right side of the top plate 30. The movable dust transfer valve portion 76 is supported such that an end portion thereof on the upper side in the rotation direction is swingable around a pivot fulcrum P2 by a support shaft 79 with respect to the top plate 30. An end portion of the movable dust transfer valve portion 76 on the lower side in the rotation direction is configured to change and adjust the swing angle through manual operation via an adjustment member 80.

Structure for Supporting Grain Tank and Engine:

Upper frames 65 and 66 that are supported by the main frames 20 on two side portions in the lateral direction of the threshing device 4 and that extend along the rotation axis direction of the threshing cylinder 31 are provided, and the grain tank 5 and the engine 6 are supported by the left and right upper frames 65 and 66.

More specifically, as shown in FIGS. 5 and 7, a pair of front and rear vertical frames 36 provided on the right side wall portion 26 are provided in a state extending vertically upward from the upper end portions of the main frames 20 in the vertical direction. The pair of front and rear vertical frames 36 extends upward of the side wall upper end frame 42. As shown in FIGS. 3 and 5, a pair of front and rear vertical frames 67 are provided at positions located on the lateral side of the left side wall portion 27 in a state extending vertically upward from the main frames 20 in the vertical direction. The pair of vertical frames 67 on the left side has a rectangular cylindrical shape, and extends upward of the side wall upper end frame 45. Also, the pair of vertical frames 67 on the left side are located at positions biased outward on the left side of the left side wall portion 27, and are provided at intervals in the left-right direction from the left side wall portion 27.

Also, as shown in FIG. 7, on the right side of the threshing device 4, the upper frame 65 is provided across the upper portions of the vertically oriented front auxiliary frame 40, the pair of vertical frames 36, and the vertically oriented rear auxiliary frame 41. As shown in FIG. 3, on the left side of the threshing device 4, the upper frame 66 is provided across the upper portions of the vertically oriented front auxiliary frame 43, the pair of vertical frames 67, and the vertically oriented rear auxiliary frame 44.

The left and right upper frames 65 and 66 are provided in a rearwardly and upwardly inclined posture, extending along the rotation axis direction (the front-rear direction of the vehicle body) of the threshing cylinder 31. The upper frames 65 and 66 are configured such that the upper surfaces thereof are wide in the left-right direction. The grain tank 5 and the engine 6 are placed on and supported by the upper surfaces of the left and right upper frames 65 and 66.

As shown in FIG. 3, the bottom surface of the grain tank 5 is formed in a downward-funneled state, and a bottom surface in a rearwardly and downwardly inclined posture on the front side is supported by the front side support frame body 68, and a bottom surface in a rearwardly and upwardly inclined posture on the rear side is supported by the rear side support frame body 69. The front side support frame body 68 extends across both left and right side portions of the threshing device 4, is placed on and supported by the left and right upper frames 65 and 66, and is bolted thereto. Also, similarly to the front side support frame body 68, the rear side support frame body 69 extends across both left and right side portions of the threshing device 4, and is placed on and supported by the left and right upper frames 65 and 66.

The rear side support frame body 69 includes left and right tank lateral support portions 70 located on both left and right sides, and left and right connecting portions (not shown) connecting the left and right tank lateral support portions 70. The left and right tank lateral support portions 70 are each formed in a substantially trapezoidal frame shape in a side view, and are placed on and supported by the left and right upper frames 65 and 66.

An engine support frame body 72 for supporting the engine 6 extends across both left and right side portions of the threshing device 4, and are placed on and supported by the left and right upper frames 65 and 66. As shown in FIG. 3, the engine support frame body 72 is provided with left and right side vertical surface portions 73 that extend along the front-rear direction on the upper side of the left and right upper frames 65 and 66, a laterally oriented connecting body (not shown) that connects the left and right side vertical surface portions, and the like.

Other Embodiments of First Embodiment (1) In the above-described embodiment, a configuration is adopted in which the top plate 30 and the side wall upper end frames 42 and 45 slide and move while sliding, but instead, various configurations may be adopted as described below.

Figure 9:
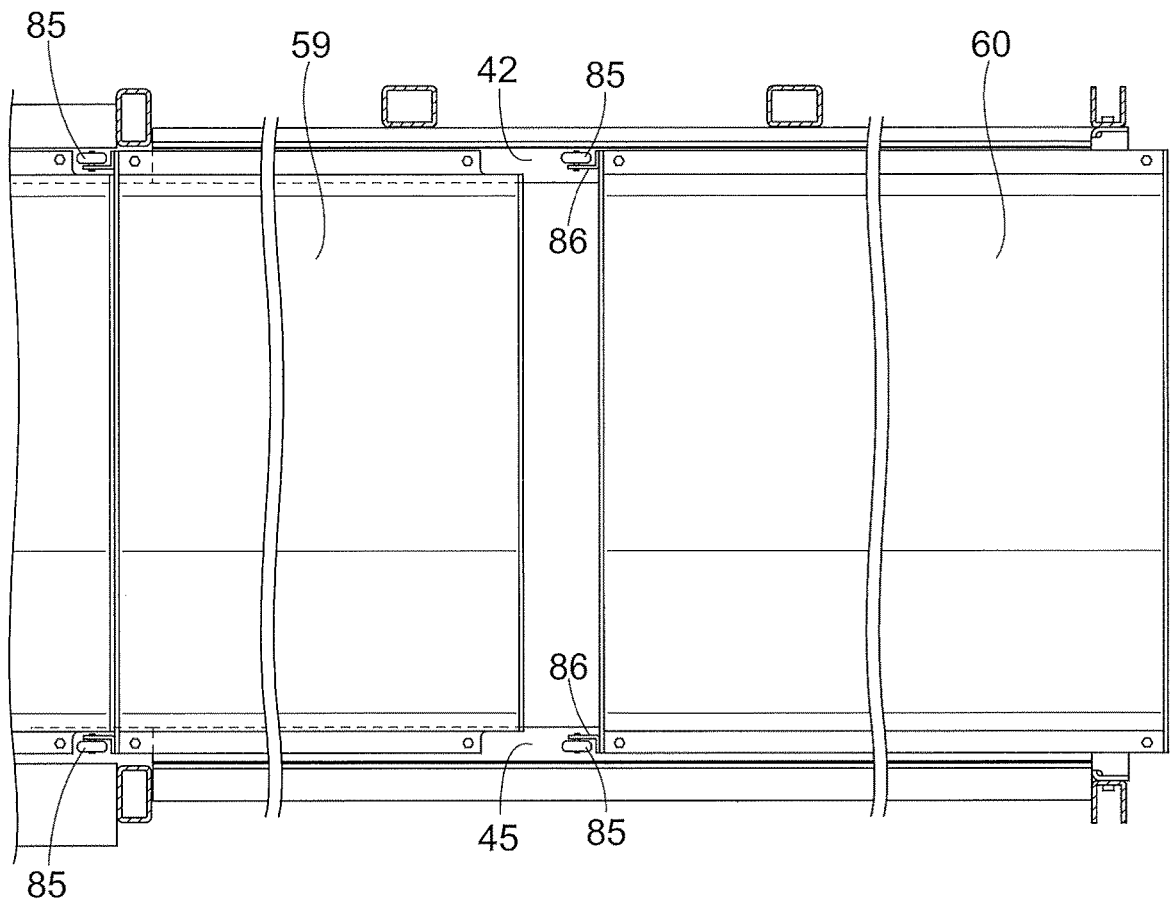
FIG. 9 is a plan view showing a structure for supporting a top plate of another embodiment.
Figure 10:
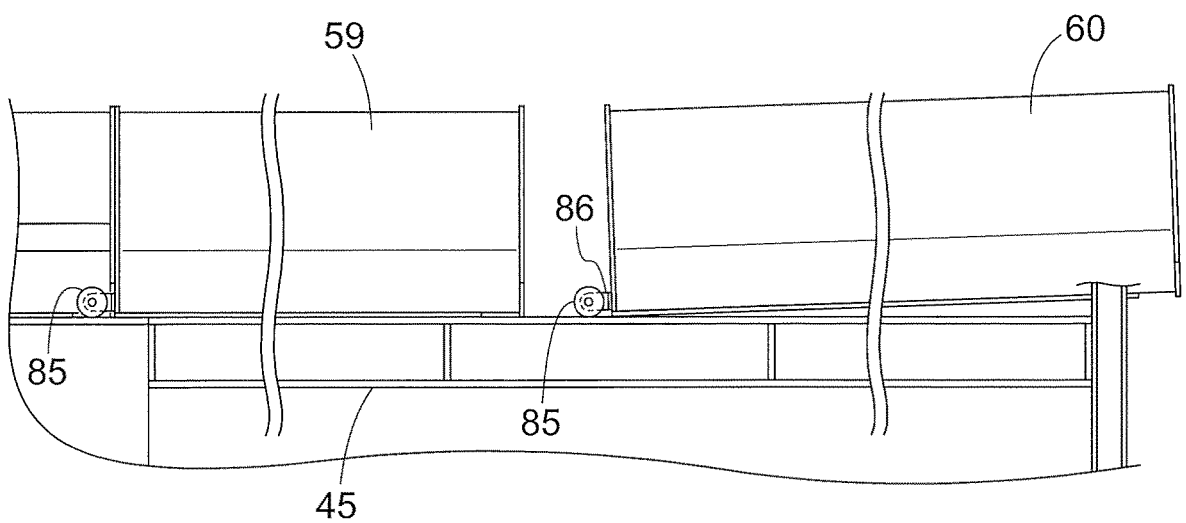
FIG. 10 is a side view showing a structure for supporting a top plate of another embodiment.

1-1:

As shown in FIGS. 9 and 10, for example, a configuration may be adopted in which the top plate 30 is provided with rolling rollers 85 serving as rolling elements that roll in contact with the side wall upper end frames 42 and 45. The rolling rollers 85 are provided on both left and right sides of the front side end portions of the dividing top plates 59 and 60 that are to be moved and operated, and are pivotably supported on the leading ends of arms 86 that extend frontward from the front side end portions of the dividing top plates 59 and 60. When all the dividing top plates 59 and 60 are placed on and supported by the side wall upper end frames 42 and 45, these rolling rollers 85 are positioned slightly above the surface of the laterally oriented plate portions 62 of the side wall upper end frames 42 and 45. Also, when the dividing top plates 59 and 60 are removed, the rolling rollers 85 come into contact with the laterally oriented plate portion 62 by slightly and manually moving upward the rear side end portions of the dividing top plates 59 and 60 to achieve a rearwardly and upwardly inclined posture.

The dividing top plates 59 and 60 can be easily slid by moving the rolling rollers 85 while rolling the rolling rollers 85 in this state.

1-2:

A configuration may be adopted in which a plurality of rolling rollers (not shown) are provided on both left and right sides of the dividing top plates 59 and 60, and a support mechanism (not shown) is provided for supporting the rolling rollers in a manner that it is possible to switchable between a state in which the rolling rollers protrude downward from lower end portions of the dividing top plates and a state in which the rolling rollers are withdrawn upward. A cam elevating mechanism or the like may be used as a support mechanism. The dividing top plates can be easily slid by switching the support mechanism to a protruding state through manual operation.

1-3:

A configuration may be adopted in which either one of the dividing top plates 59 and 60 and the side wall upper end frames 42 and 45 include slip promoting bodies capable of facilitating sliding movement, instead of the rolling rollers 85 as described above. It is possible to use a fluororesin material or the like as a slip promoting body, for example.

(2) In the above-described embodiment, a configuration is adopted in which a plurality of detachment prevention guides 64 are provided at intervals along the longitudinal direction of the side wall upper end frames 42 and 45 as appropriate, but instead, a configuration may be adopted in which the detachment prevention guide 64 extends long and continuous along the longitudinal direction of the side wall upper end frames 42 and 45.

(3) Although, in the above-described embodiment, a configuration is adopted in which three dividing top plates 58, 59, and 60 obtained by dividing the top plate 30 in the front-rear direction are provided, there is no limitation thereto. It is possible to adopt a configuration in which the top plate 30 is divided into two, a configuration in which the top plate 30 is divided into four or more, or a configuration in which the top plate 30 is continuous as a single body without dividing the top plate 30.

(4) In the above-described embodiment, a configuration is adopted in which the grain tank 5 and the engine 6 are provided above the threshing device 4, but instead, a configuration may be adopted in which the grain tank 5 and the engine 6 are provided in a state in which the grain tank 5 and the engine 6 are arranged side-by-side with the threshing device 4.

Second Embodiment

Next, a second embodiment will be described below with reference to FIGS. 11 to 23.

Below, with reference to the accompanying drawings, an example will be described in which an embodiment of a combine harvester according to the present invention is applied to an ordinary combine harvester.

Figure 11:
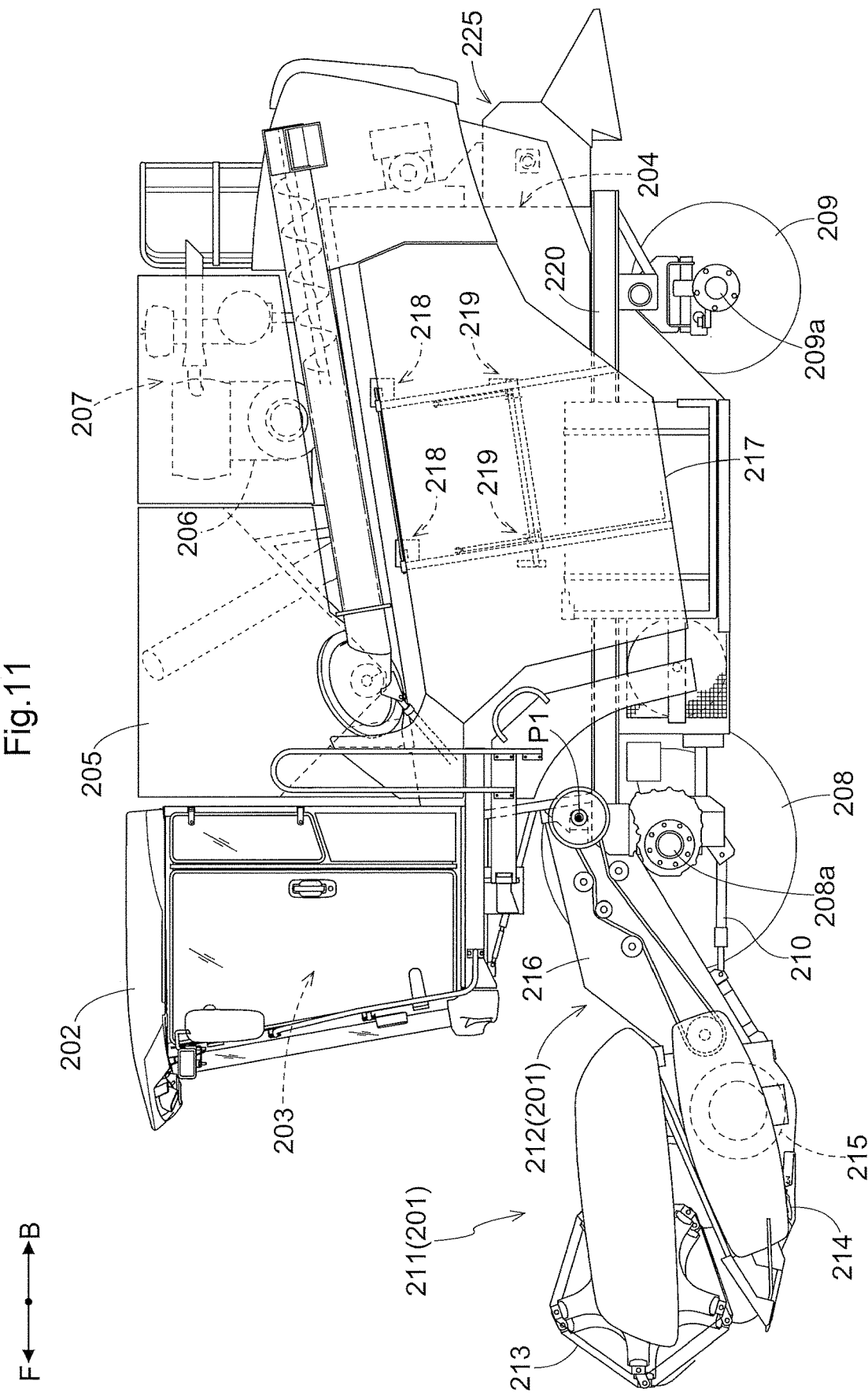
FIG. 11 is an overall side view of a combine harvester, showing a second embodiment (the same applies to FIG. 12 to FIG. 23 hereinafter).
Figure 12:
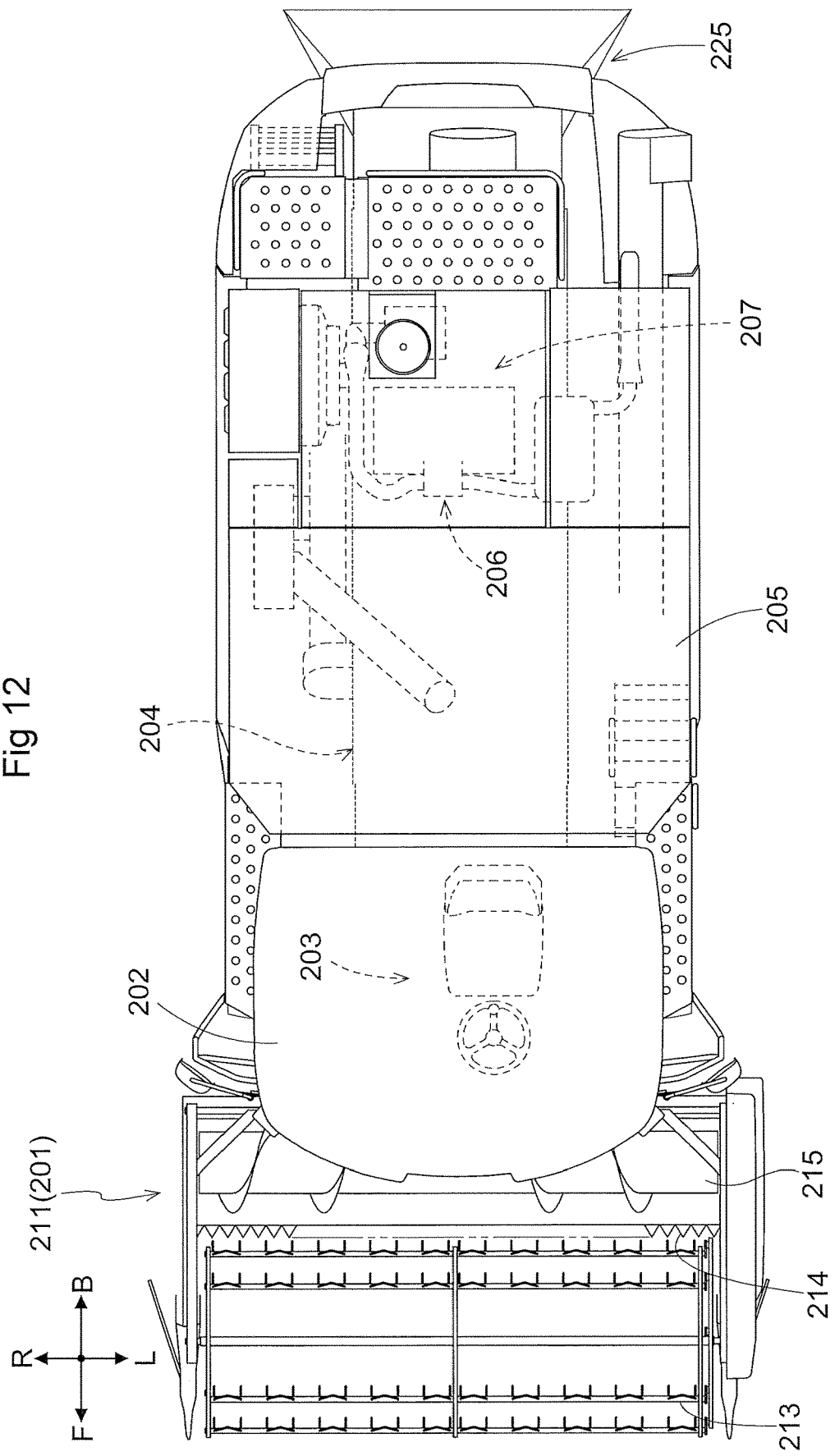
FIG. 12 is an overall plan view of the combine harvester.

Overall Configuration:

As shown in FIGS. 11 and 12, a combine harvester is provided with a reaping transport unit 201 that reaps a crop and transports it rearward, a driving portion 203 covered with a cabin 202, a threshing device 204 that performs a threshing process of threshing articles reaped by the reaping transport unit 201, a grain tank 205 that stores grain obtained by the threshing process performed by the threshing device 204, a motor 207 having an engine 206 as a power source, a pair of left and right front wheels 208 that cannot be steered and are rotationally driven, a pair of left and right rear wheels 209 that can be steered, and the like. A screw conveyor type grain discharge device for transporting stored grain to the outside of the vehicle body is provided on the left side of the grain tank 205.

In this embodiment, when defining the front-rear direction of the vehicle body, this direction is defined along the vehicle body traveling direction in a working state, and when defining the left-right direction of the vehicle body, left and right are defined as viewed from the vehicle body traveling direction. That is, the direction indicated by reference sign (F) in FIGS. 11 and 12 is the front side of the vehicle body, and the direction indicated by reference sign (B) in FIGS. 11 and 12 is the rear side of the vehicle body. The direction indicated by reference sign (L) in FIG. 12 is the left side of the vehicle body, and the direction indicated by reference sign (R) in FIG. 12 is the right side of the vehicle body.

The reaping transport unit 201 is supported by a reaping elevating cylinder 210 as an elevating actuator at the front portion of the vehicle body so as to be able to be driven up and down around a laterally oriented fulcrum P1. The reaping transport unit 201 is provided with a reaping header 211 that reaps a crop to be planted and gathers the reaped crop in the center in a cutting width direction, and a feeder 212 that transports the reaped and centrally gathered crop to the threshing device 204 at the rear of the vehicle body.

The reaping header 211 has a rotating reel 213 that rakes the tip side of a crop to be reaped rearward, a clipper-type cutting blade 214 that cuts and reaps the root of the crop, and a lateral feed auger 215 that gathers the reaped crop toward the center in the cutting width direction, and the like.

Although not shown, the feeder 212 includes a tubular transport case 216 in which endless rotating chains are wound and stretched across front and rear wheel bodies, a transport conveyor is provided with a plurality of locking carriers across each of the endless rotating chains, and the transport conveyor is configured to transport the crop delivered from the reaping header 211 upward and rearward.

The threshing device 204 is provided with the grain tank 205 and the engine 206 in a direction in which the grain tank 205 and the engine 206 are arranged side-by-side in the front-rear direction in a state in which the threshing device 204 is located at a low position in the center of the vehicle body in the left right direction, and above the threshing device 204, the grain tank 205 is located on the front side of the vehicle body, and the engine 206 serving as a power source is located on the rear side of the vehicle body. The left and right outer sides of the threshing device 204 are covered by the outer cover 217. Although not described in detail, the outer cover 217 is configured such that an upper portion of the outer cover 217 is supported by a pivotal portion 218 extending along the front-rear direction so as to be swingable and openable, and the position of the outer cover 217 can be held in a closed state by an engagement locking mechanism 219 that can be released through manual operation.

Figure 13:
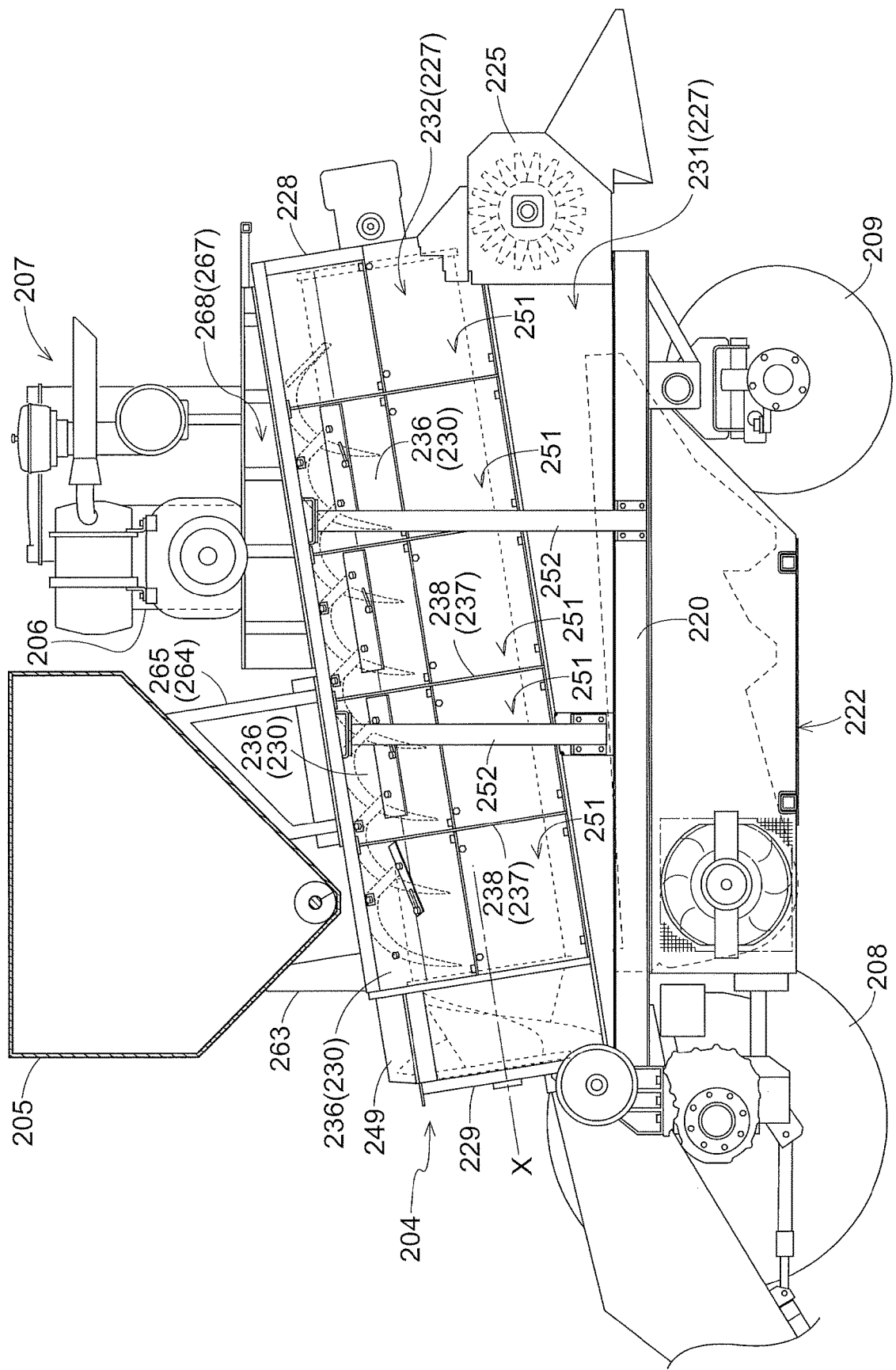
FIG. 13 is side view showing a structure for supporting a threshing device.

As shown in FIGS. 11 and 13, a pair of left and right main frames 220 extending in the front-rear direction of the vehicle body are provided below the vehicle body. The left and right main frames 220 support the entire vehicle body, and the main frames 220 correspond to a vehicle body frame.

The left and right main frames 220 are formed of a channel material having a substantially C-shaped cross-section, and are provided long in the front-rear direction from the vehicle body front portion to the vehicle body rear portion. Axles 208*a* and 209*a* of the left and right front wheels 208 and the left and right rear wheels 209 are provided at positions lower than the left and right main frames 220. The left and right front wheels 208 and the left and right rear wheels 209 are provided in a state positioned on the outer side of the vehicle body in the left-right direction of each of the left and right main frames 220, and the left and right main frames 220 are supported by the left and right front wheels 208 and the left and right rear wheels 209.

Threshing Device:

Following is a description of the threshing device 204.

Figure 14:
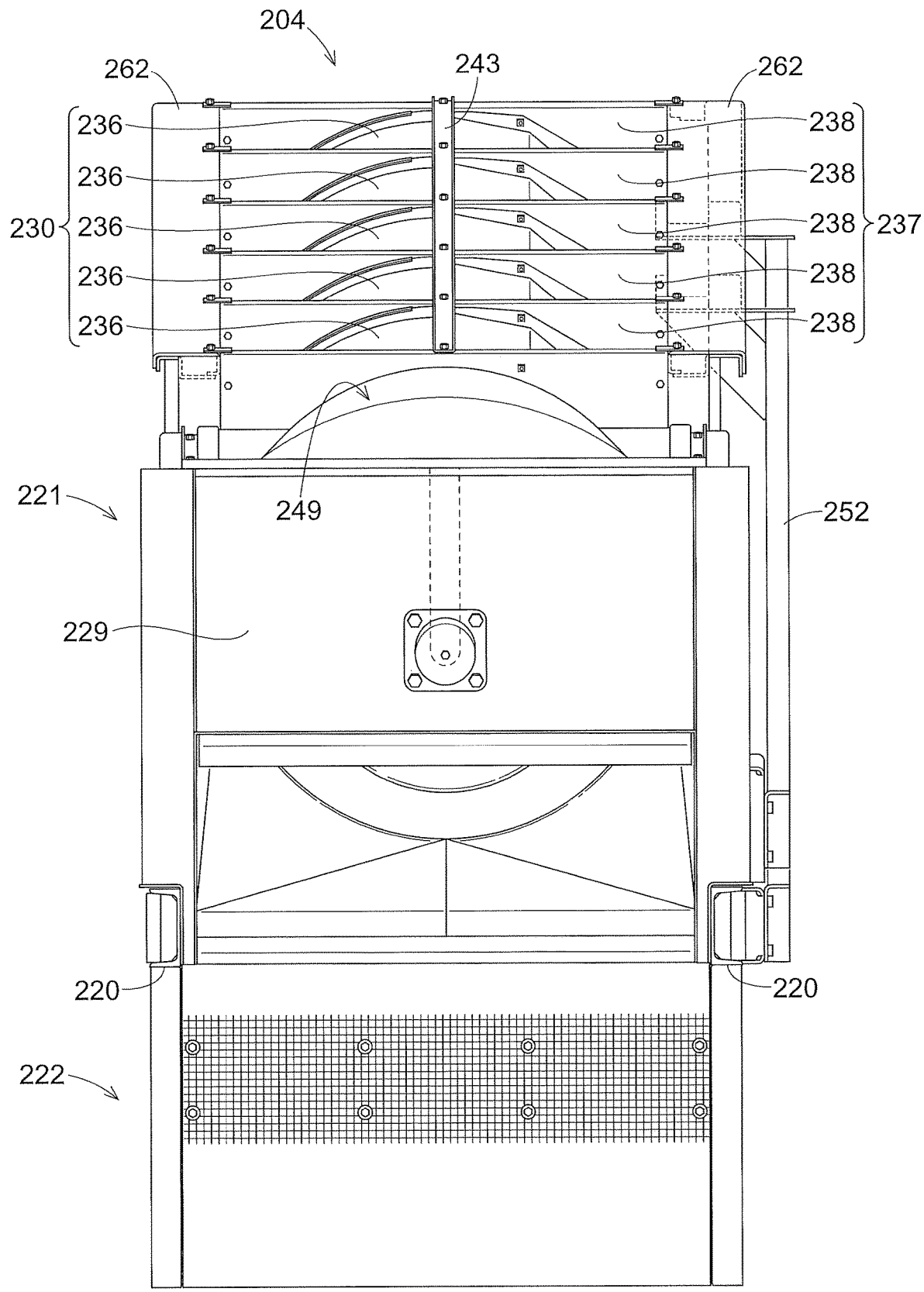
FIG. 14 is a front view of the threshing device.
Figure 17:
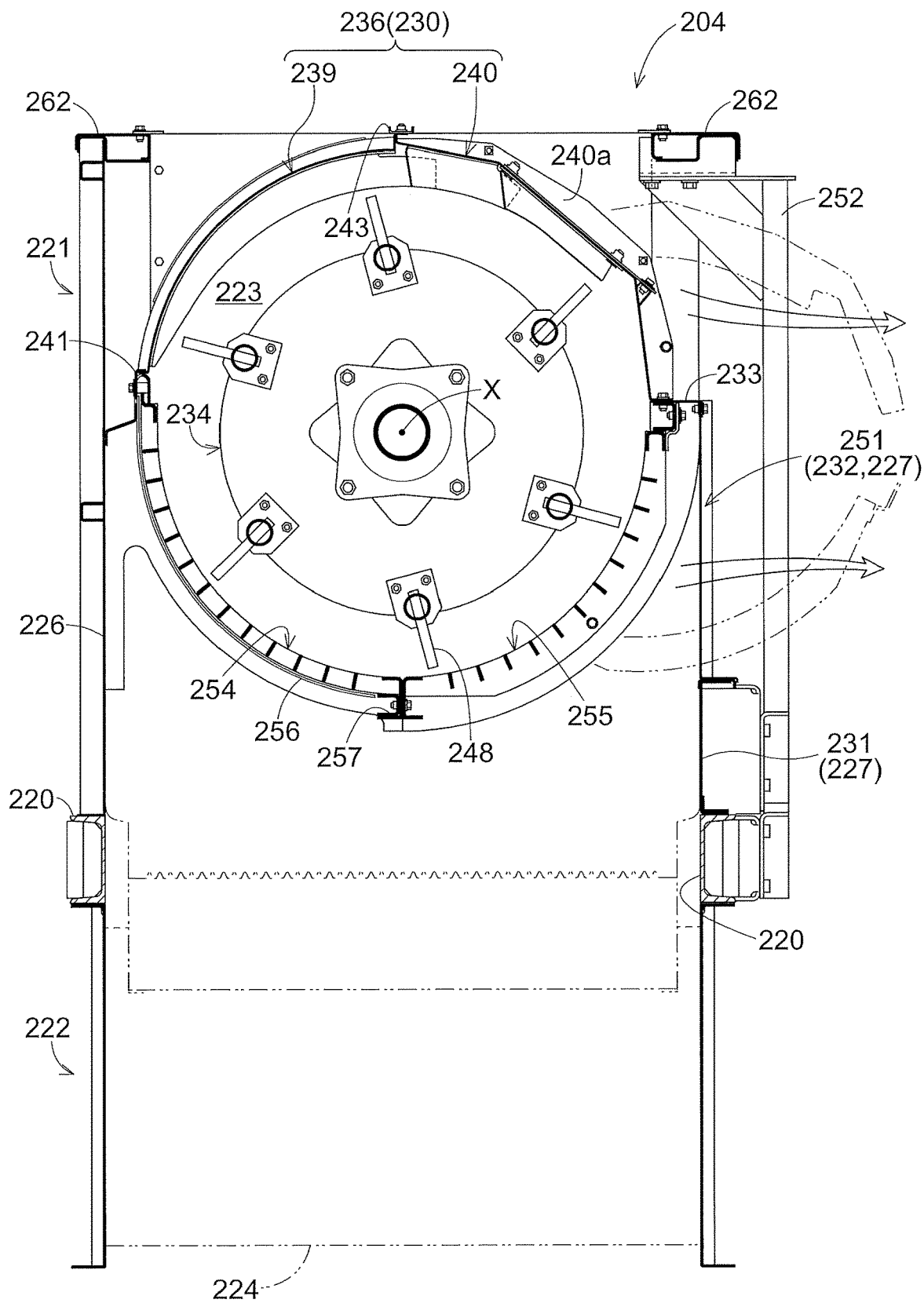
FIG. 17 is a vertical cross-sectional front view of the threshing device.

As shown in FIGS. 13, 14, and 17, the threshing apparatus 204 includes a threshing unit 221 that performs a grain removal process, and a sorting unit 222 that performs a sorting process of sorting processed articles after the grain removal process has been performed by the threshing unit 221.

As shown in FIG. 17, a threshing chamber 223 where reaped grain culm is threshed is formed in the threshing unit 221. Although not described in detail, the sorting unit 222 is provided with a sorting processing unit 224 (see FIG. 17) that, while shaking the processed articles after the grain removal process has been performed and transferring the articles into the internal space surrounded by a rectangular peripheral wall portion, sorts these articles into grain, secondary products such as branch-attached grain, waste straw and the like. As shown in FIG. 11, a shredding device 225 that shreds the threshed material (waste straw and the like) after threshing in the threshing device 204 is provided on the vehicle body rear side of the threshing device 204.

As shown in FIGS. 13, 14, and 17, the threshing unit 221 is mounted on and supported by the left and right main frames 220. The threshing unit 221 has a configuration in which the threshing unit 221 is surrounded by plate-shaped left and right side wall portions 226 and 227 serving as left and right vertically oriented support portions extending in the vertical direction, a substantially plate-shaped rear wall portion 228 connecting the rear end portions of the left and right side wall portions 226 and 227, a substantially plate-shaped front wall portion 229 connecting the front end portions of the left and right side wall portions 226 and 227, a top plate 230 that extends across the left and right side wall portions 226 and 227 and covers the upper portions thereof, and the like. The front wall portion 229 and the rear wall portion 228 are provided with openings through which threshed articles pass.

The threshing unit 221 is configured to be narrow in the vertical direction on the front side of the vehicle body and wide in the vertical direction toward the rear side of the vehicle body. Also, the low end portion thereof is placed on the main frames 220 extending in a substantially horizontal posture along the front-rear direction. Therefore, the upper end portion of the threshing unit 221 has a rearwardly and upwardly inclined posture that is located higher toward the rear side.

As shown in FIG. 17, out of the left and right side wall portions 226 and 227, the right side wall portion 226 located on the right side has a shape continuous in the vertical direction. As shown in FIG. 13, the left side wall portion 227 located on the left side is provided with upper side wall portions 232 having substantially the same width along the front-rear direction, and a lower side wall portion 231 formed in a substantially triangular shape in a side view to be narrow in the vertical direction on the front side of the vehicle body, and be wide in the vertical direction toward the rear side of the vehicle body.

Figure 18:
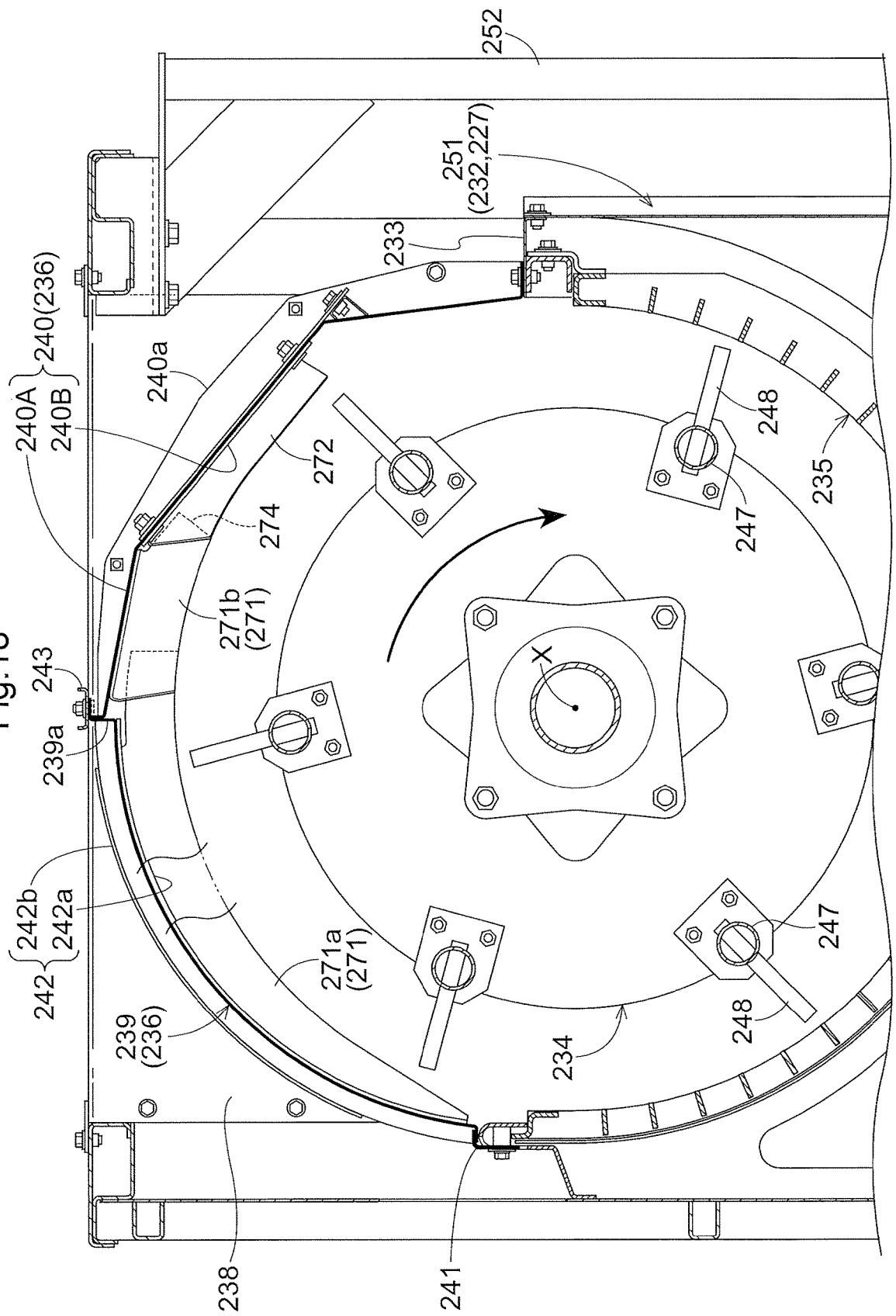
FIG. 18 is a vertical cross-sectional front view of main portions of the threshing device.

The right side wall portion 226 is bolted to a main frame 220 in a state in which the lower end portion of the right side wall portion 226 is placed on the upper surface of the main frame 220. The lower side wall portion 231 of the left side wall portion 227 is bolted to a main frame 220 in a state in which the lower end portion of the left side wall portion 227 is placed on the upper surface of the main frame 220. The upper side wall portion 232 of the left side wall portion 227 is bolted thereto in a state in which the lower end portion of the upper side wall portion 232 is placed on the upper end portion of the lower side wall portion 231. As shown in FIGS. 17 and 18, the upper end portion of the upper side wall portion 232 is bolted to a fixing bracket 233.

As shown in FIGS. 13, 17, 18, and 20, the threshing chamber 223 is provided with a threshing cylinder 234 that rotates around an axis X extending along the front-rear direction of the vehicle body, and is provided with, below the threshing cylinder 234, the receiving net 235 that is formed in a substantially arc shape in a front view to extend along the outer circumferential portion of the threshing cylinder 234. Reaped grain culm is introduced into the threshing chamber 223 from the front side of the vehicle body, and a grain removal process is performed by the threshing cylinder 234 and the receiving net 235. The threshing cylinder 234 is provided in a rearwardly and upwardly inclined posture to have an oblique posture in which the rotation axis X becomes gradually higher toward the rear side of the vehicle body. Similarly to the threshing cylinder 234, the receiving net 235 is also provided in a rearwardly and upwardly inclined posture in a side view.

Dividing Structure of Top Plate:

As shown in FIGS. 13 and 14, the top plate 230 is constituted by a plurality of dividing top plates 236 that are divided along the rotation axis direction of the threshing cylinder 234. Also, division border portions 237 between the plurality of dividing top plates 236 are respectively provided with support frames 238 that extend from one side portion to the other side portion located in the lateral direction of the threshing device 204. The support frames 238 are each constituted by a plate-shaped body having a vertically oriented posture, and specifically, six support frames 238 are provided. Five dividing top plates 236 that are divided in a state partitioned by the six support frames 238 are individually provided detachably along the lateral direction.

As shown in FIGS. 17 and 18, the top plate 230 covering an upper portion of the threshing chamber 223, specifically, the plurality of dividing top plates 236, are each provided in a substantially curved shape in a front view to substantially conform to the locus of rotation of the outer end portion of the threshing cylinder 234. Also, each dividing top plate 236 is constituted by two top plate constituent bodies 239 and 240 that are separated along the circumferential direction of the threshing cylinder 234. The right top plate constituent body 239 corresponding to the right half of the two top plate constituent bodies 239 and 240 has a smooth arc shape. The left top plate constituent body 240 corresponding to the left half thereof has a shape in which a flat plate body is bent at two positions to have three plate-shaped portions.

Figure 19:
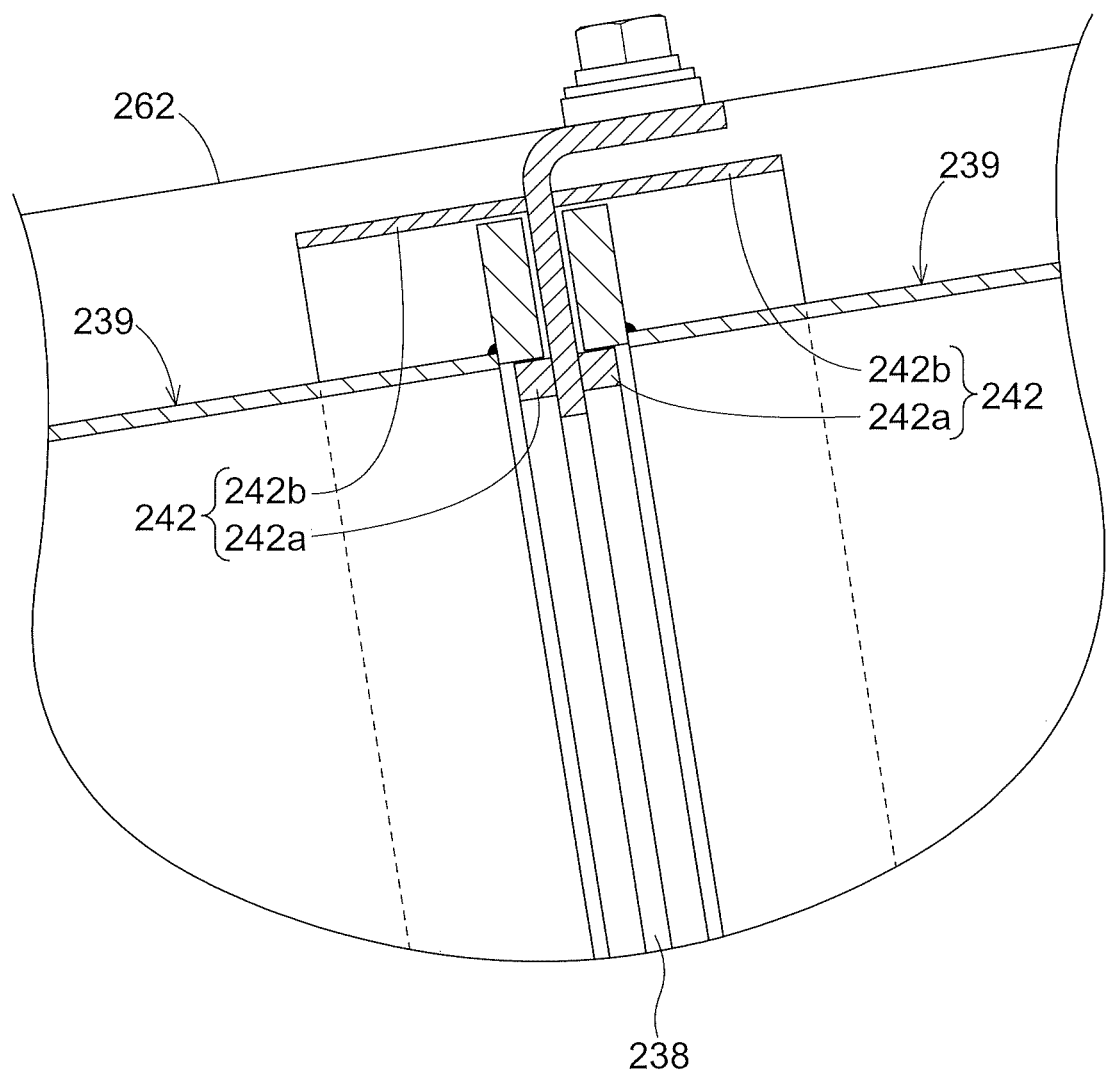
FIG. 19 is a vertical cross-sectional side view showing a structure for supporting a top plate.

The right top plate constituent body 239 is bolted to a fixing bracket 241 whose right end portion is fixed to the support frame 238. The right top plate constituent body 239 has a configuration in which the positions of both front and rear side portions are held by the arc-shaped rail portion 242 provided on a side surface of the support frame 238. As shown in FIGS. 18 and 19, the rail portion 242 includes an inner rail portion 242a located on the inner circumferential side and an outer rail portion 242b located on the outer circumferential side, and the rail portion 242 is slidably supported in a state in which the end portion of the right top plate constituent body 239 is held between the inner rail portion 242a and the outer rail portion 242b.

The left end portion of the right top plate constituent body 239 is provided with a locking portion 239a that is bent outward in a substantially L-shape, receives an end portion of the left top plate constituent body 240, and is restricted due to being in contact with a contact member 243 from above. As shown in FIG. 14, the contact member 243 extends long along the front-rear direction to be in contact with the five dividing top plates 236 from above, and is fixed by bolts to the six support frames 238.

As shown in FIGS. 17 and 18, the left top plate constituent body 240 is provided with attachment surfaces 240a having a vertically oriented posture on both front and rear side end portions, and is fixed to the support frame 238 through bolting at multiple positions in a state in which the attachment surfaces 240a are pressed against the support frame 238. The left top plate constituent bodies 240 located on both front and rear sides with respect to the support frame 238 are fastened thereto in a state in which the left top plate constituent bodies 240 hold the support frame 238. The left outer end portion of the left top plate constituent body 240 is bolted to the fixing bracket 233.

Figure 20:
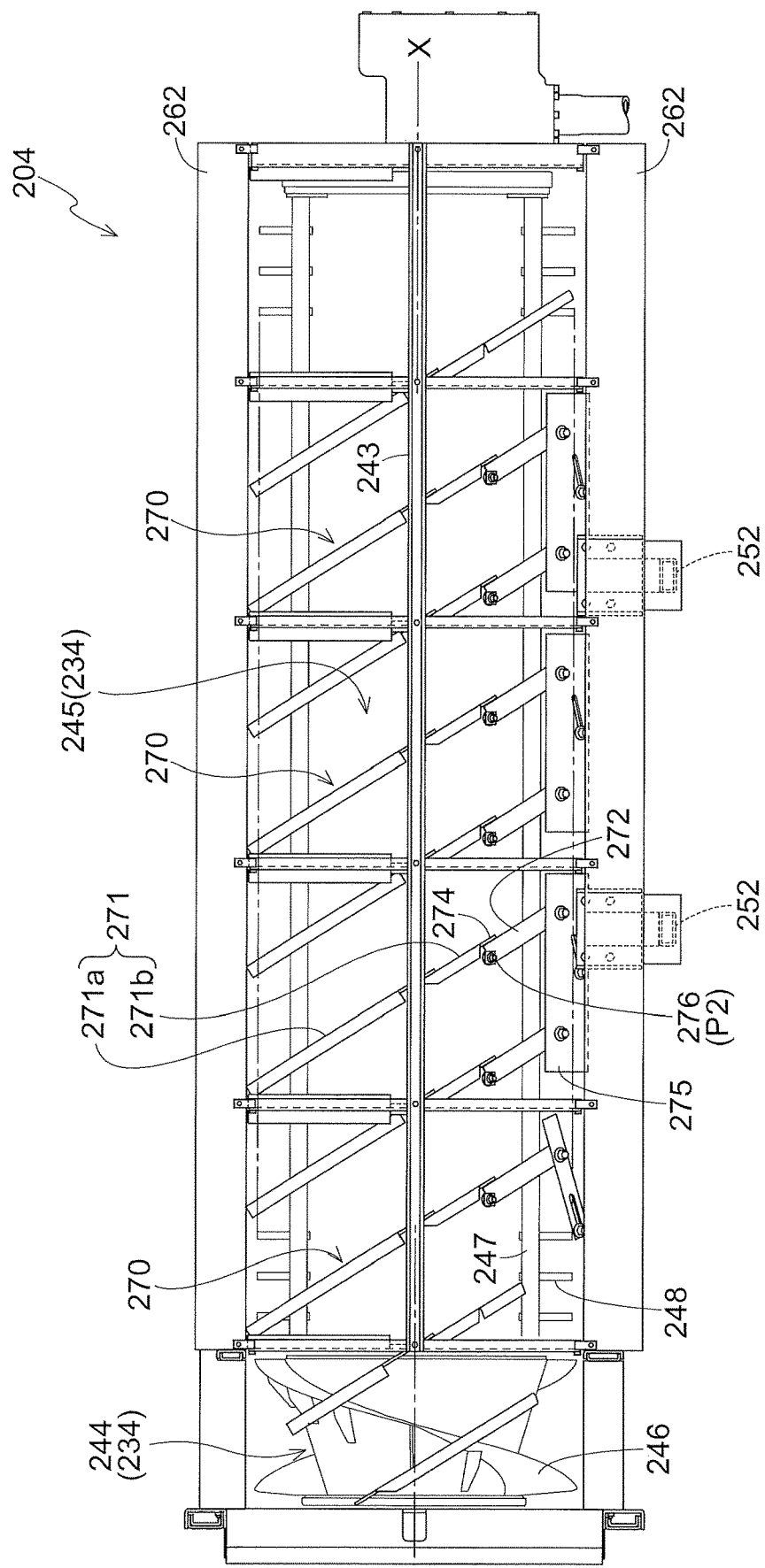
FIG. 20 is a plan view showing a state in which a dust transfer valve is attached.

As shown in FIG. 20, the threshing cylinder 234 is provided with a raking unit 244 that is located on a front end side and rakes reaped grain culm, and a threshing unit 245 that is located on a rear side of the raking unit 244 and threshes the reaped grain culm. The raking unit 244 is configured to rake the reaped grain culm fed from a feeder 212 into a threshing chamber 223 by a spiral blade 246. The threshing unit 245 is provided with a plurality of rod-shaped members 247 at intervals in the circumferential direction, and a plurality of rod-shaped threshing teeth 248 that respectively protrude radially outward from the rod-shaped members 247.

Five dividing top plates 236 of the top plate 230 that correspond to the threshing unit 245 are provided detachably along the lateral direction. Upper surfaces 249 of the threshing cylinder 234 that correspond to the raking unit 244 have a shape continuous in the circumferential direction, and cannot be detached along the lateral direction. This is because no receiving net 235 is present in this region, and the frequency of maintenance work is low.

The top plate 230 having the above-described configuration can be removed outward to the left side of the vehicle body, which is an example of one side in the lateral direction of the vehicle body. When the top plate 230 is removed, first, the bolt connection of the left top plate constituent body 240 to the support frame 238 is released, and the left top plate constituent body can be removed to the outer left side of the vehicle body. Then, the bolt connection of the right top plate constituent bodies 239 to the fixing bracket 241 is released. At this time, operation is performed through openings formed at appropriate positions of the right side wall portion 226. After the bolt connection is released, the right top plate constituent body can be removed to the outer left side by sliding along the rail portion 242 to the outer left side of the vehicle body.

Dividing Structure of Side Wall Portion:

As shown in FIG. 13, the upper side wall portion 232 of the left side wall portion 227 is provided at a position corresponding to the lower portion of the threshing cylinder 234 and the receiving net 235 in a side view. This upper side wall portion 232 is constituted by a plurality of dividing walls 251 that are divided along the rotation axis direction of the threshing cylinder 234. The dividing walls 251 are supported detachably along the lateral direction.

The dividing walls 251 are divided at the same positions as where the top plate 230 is divided along the rotation axis direction, and are detachable in the same direction as the top plate 230, that is, toward the left side of the vehicle body. More specifically, as described above, both upper and lower side portions of a dividing wall 251 (the upper side wall portion 232) are bolted, and thus the dividing wall 251 can be removed to the outer left side by releasing the bolt connection thereof. Note that, as shown in FIGS. 13 and 14, although the left lateral portion of the threshing device 204 is provided with a pair of front and rear vertically oriented frames 252 in a state in which the front and rear vertically oriented frames extend upward from the main frames 220, a gap is formed between the vertically oriented frame 252 and a dividing wall 251 that is adjacent thereto in the lateral direction, and thus the dividing wall 251 can be removed through this gap.

Dividing Structure of Receiving Net:

The receiving net 235 is constituted by a plurality of dividing receiving nets 253 that are divided along the rotation axis direction of the threshing cylinder 234. The dividing receiving nets 253 are supported detachably along the lateral direction. The receiving net 235 is divided at the same positions as where the top plate 230 is divided along the rotation axis direction of the threshing cylinder 234, and is detachable in the same direction as the top plate 230, that is, toward the left side of the vehicle body.

The receiving net 235 is provided at a portion that correspond to four dividing top plates 236, which are located on the front side, of the five dividing top plates 236, and four dividing receiving nets 253 are provided. The receiving net 235 is provided in a substantially curved shape in a front view to substantially conform to the locus of rotation of the outer end portion of the threshing cylinder 234. Also, as shown in FIG. 17, each dividing receiving net 253 is constituted by two receiving net constituent bodies 254 and 255 that are separated along the circumferential direction of the threshing cylinder 234.

The right receiving net constituent body 254 is received and guided by an arc-shaped guide member 256 attached to front and rear side surfaces of the support frame 238, and is supported in a state in which the right end portion thereof is pressed against a right fixing bracket 241. Also, the left end portion thereof is bolted to a relay bracket 257 provided at a portion where the left and right receiving net constituent bodies 254 and 255 are connected to each other. The right end portion of the left receiving net constituent body 255 is bolted to the relay bracket 257, and the left end portion thereof is bolted to the left fixing bracket 233. Also, an intermediate portion in the left-right direction is bolted to the support frame 238. The portion connected to the support frame 238 is fastened together with the receiving net constituent body 255 that is adjacent thereto with the support frame 238 held therebetween.

Therefore, the left receiving net constituent body 255 can be removed to the outer left side by releasing the connections made by a plurality of bolts. The right receiving net constituent body 254 can be removed by removing the left receiving net constituent body 255 and releasing the bolt connection to the relay bracket 257.

Figure 15:
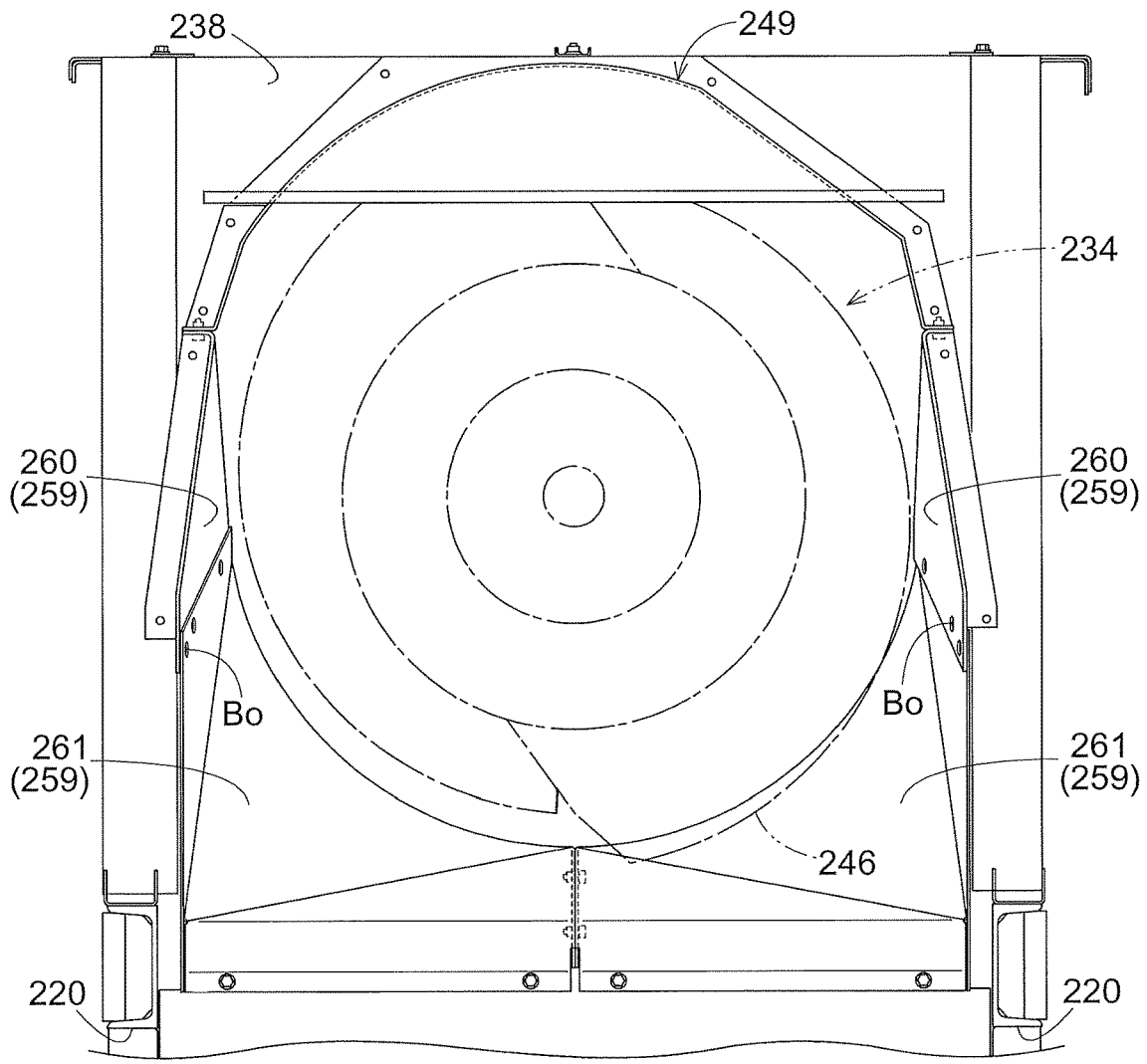
FIG. 15 is a front view of a threshing inlet plate arrangement portion.

As shown in FIG. 15, a vehicle body-front side portion of the threshing cylinder 234 that corresponds to the raking unit 244, and corresponds to the lower side of the upper surface 249, is provided with threshing inlet plates 259 for guiding the reaped grain culm transported by the feeder 212 into the entrance of the threshing chamber 223. The threshing inlet plate 259 is provided with a side portion 260 covering both left and right side portions of the raking unit 244 of the threshing cylinder 234, and a bottom portion 261 that has a shape extending from a transport outlet of the feeder 212 and gradually spreading to the diameter of the threshing cylinder 234. The bottom portion 261 is divided at a dividing surface located at the center in the left-right direction.

Figure 16:
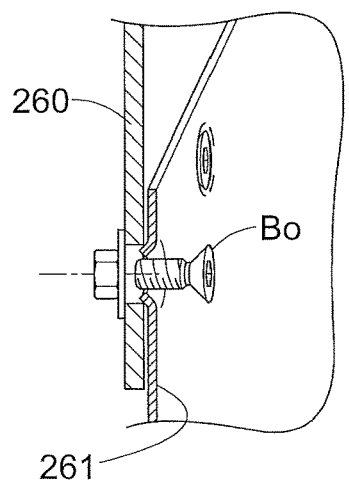
FIG. 16 is a cross-sectional view showing a connection state of the threshing inlet plate.

Thus, the threshing inlet plate 259 is configured to be divided into four portions of side portions 260 on both left and right sides, and left and right bottom portions 261. Also, the side portion 260 on the left side and the bottom portion 261 on the left side are bolted to each other in a state in which they overlap with each other. The side portion 260 on the right side and the bottom portion 261 on the right side are bolted to each other in a state in which they overlap with each other. As shown in FIG. 16, the head portion of a bolt Bo is provided with a hexagonal hole with which a hexagonal wrench can engage. Note that the side portions 260 on both left and right sides and the upper surface 249 are bolted to each other through a flange connection. The threshing inlet plate 259 can be easily removed by releasing the bolt connection even if the plate has worn due to the flow of a crop. The left and right side portions 260 can be removed to the lateral side, and the left and right bottom portions 261 can be removed to the front side of the vehicle body in a state in which the feeder 212 is removed.

Figure 22:
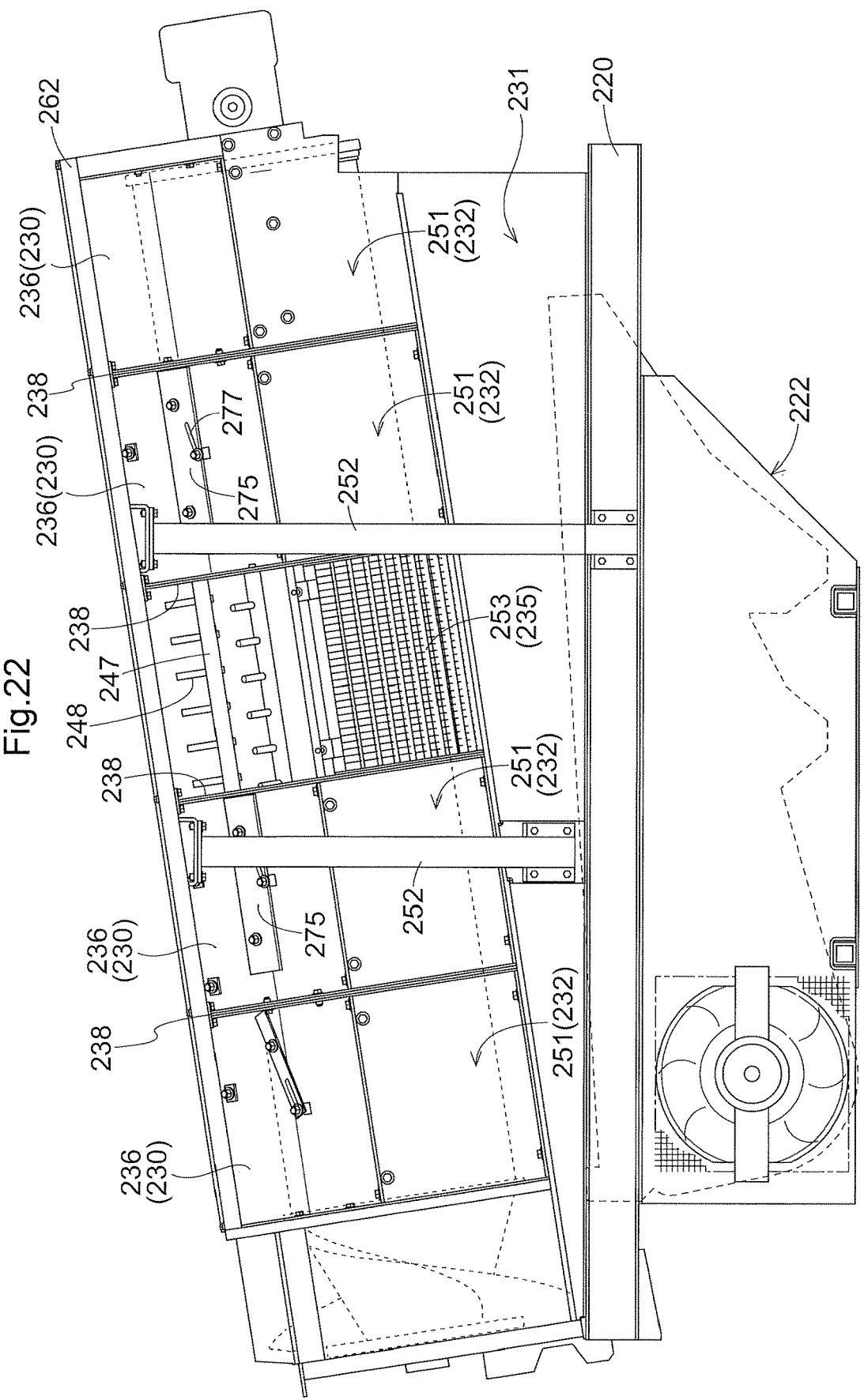
FIG. 22 is a side view of the threshing device in a state in which portions of dividing top plates and dividing walls are removed.

Structure for Supporting Grain Tank and Engine:

As shown in FIGS. 14, 17, and 22, two side portions in the lateral direction of the threshing device 204 are provided with upper frames 262 that extend along the rotation axis direction of the threshing cylinder 234 (the front-rear direction of the vehicle body) across the upper portions of a plurality of support frames 238. The upper frames 262 are each configured to have a rearwardly and upwardly inclined posture, and are configured such that the upper surfaces thereof are wide in the left-right direction. Also, the grain tank 205 and the engine 206 are placed on and supported by the left and right upper frames 262. The left lateral portion of the threshing device 204 is provided with a pair of front and rear vertically oriented frames 252 in a state in which the front and rear vertically oriented frames extend upward from the main frame 220.

As shown in FIG. 13, the bottom surface of the grain tank 205 is formed in a downward-funneled state, and a bottom surface in a rearwardly and downwardly inclined posture on the front side is supported by the front side support frame body 263, and a bottom surface in a rearwardly and upwardly inclined posture on the rear side is supported by the rear side support frame body 264. The front side support frame body 263 extends across both left and right side portions of the threshing device 204, is placed and supported on the left and right upper frames 262, and is bolted thereto. Also, similarly to the front side support frame body 263, the rear side support frame body 264 extends across both left and right side portions of the threshing device 204, is placed on and supported by the left and right upper frames 262.

The rear side support frame body 264 includes left and right tank lateral support portions 265 that are formed in a substantially trapezoidal frame shape in a side view, and left and right connecting portions (not shown) connecting the left and right tank lateral support portions 265. The left and right tank lateral support portions 265 are respectively placed on and supported by the left and right upper frames 258.

The engine support frame body 267 that supports the engine 206 extends across both left and right side portions of the threshing device 204, and are placed on and supported by the left and right upper frames 262. The engine support frame body 267 is provided with left and right side vertical surface portions 268 that extend along the front-rear direction on the upper side of the left and right upper frames 262, a laterally oriented connecting member (not shown) that connects the left and right side vertical surface portions, and the like.

Figure 21:
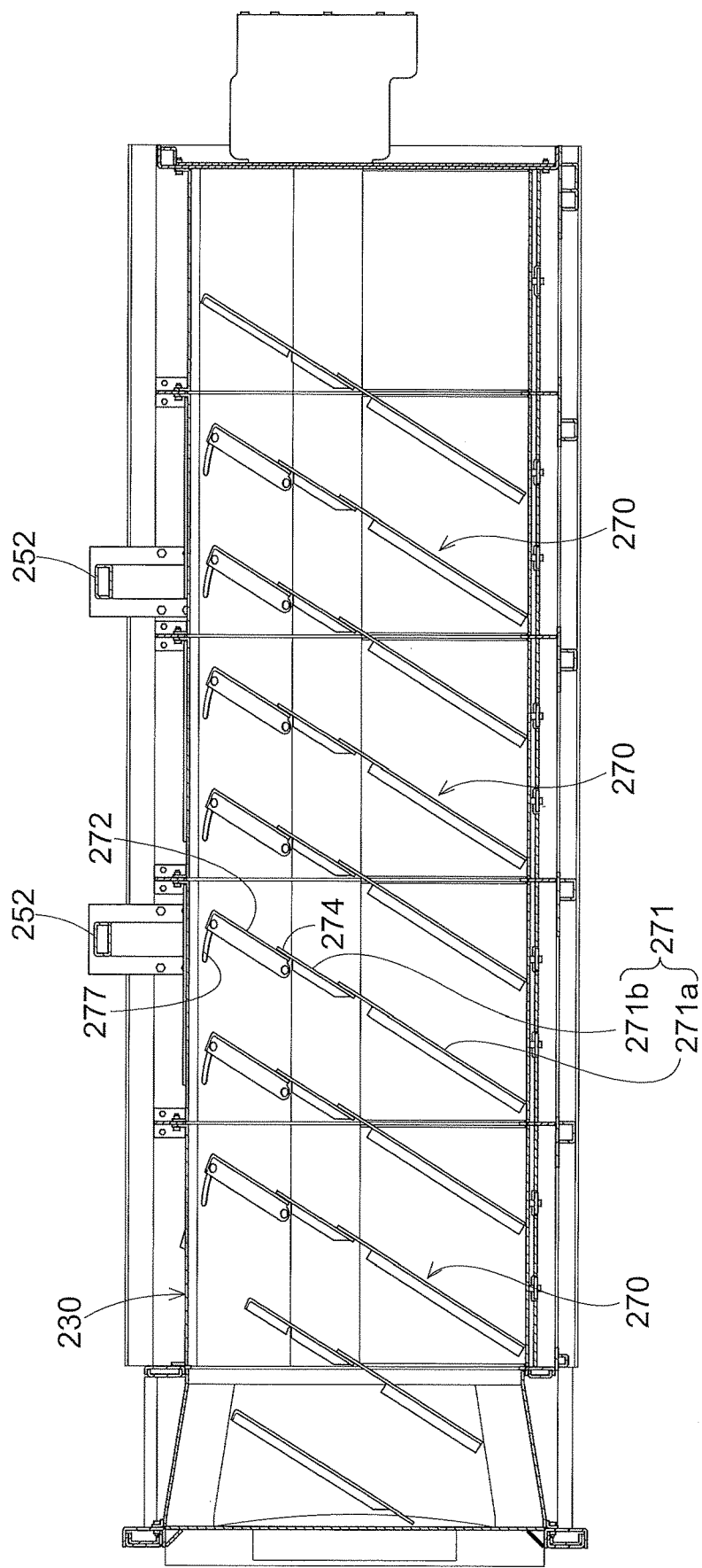
FIG. 21 is a bottom view of the top plate when viewed from the lower side.

Dust Transfer Valve:

The threshing chamber 223 is provided with dust transfer valves 270 that are located on the inner side of the top plate 230 and are for transferring threshed articles from one side (the front side of the vehicle body) toward the other side (the rear side of the vehicle body) located in the rotation axis direction of the threshing cylinder 234. As shown in FIGS. 20 and 21, a plurality of dust transfer valves 270 are provided frontward and rearward, starting from the position corresponding to the front end portion of the threshing cylinder 234 up to a portion located on the rear side of the threshing cylinder 234 in a state in which the dust transfer valves 270 are arranged side-by-side at intervals in the rotation axis direction. The plurality of dust transfer valves 270 are attached to the inner surface of the top plate 230, and extend in a spiral shape in a state in which the dust transfer valves 270 are located on the outer circumferential side of the threshing cylinder 234. That is, the dust transfer valves 270 are provided to have a predetermined feed angle to transfer the threshed articles to the vehicle body rear side with respect to the rotation of the threshing teeth 248 such that the position of the threshing cylinder 234 changes to the vehicle body rear side as the position of the threshing cylinder 234 from the upper side in the circumferential direction toward the lower side changes.

The plurality of dust transfer valves 270 each include a fixed dust transfer valve portion 271 attached to the top plate 230 in a positionally fixed state, and a movable dust transfer valve portion 272 that is adjacent to the fixed dust transfer valve portion 271 in the circumferential direction and is capable of changing and adjusting the feed angle through swinging. As shown in FIG. 18, the fixed dust transfer valve portion 271 is located on the upper side in the rotation direction of the threshing cylinder 234, and the movable dust transfer valve portion 272 is located on the lower side in the rotation direction. Also, the fixed dust transfer valve portion 271 is located on the lower side in the processed article transfer direction with respect to the movable dust transfer valve portion 272, and the fixed dust transfer valve portion 271 and the movable dust transfer valve portion 272 overlap with each other along the circumferential direction.

More specifically, as shown in FIG. 18, attachment surfaces are connected to the fixed dust transfer valve portion 271 and the movable dust transfer valve portion 272 in a state in which the attachment surfaces extend along the plate surface of the top plate 230, and the fixed dust transfer valve portion 271 and the movable dust transfer valve portion 272 are formed to have a substantially L-shaped cross-section having a feed action surface 274 that extends orthogonally thereto. The threshing cylinder 234 is configured to rotate clockwise in a front view. At a portion of the fixed dust transfer valve portion 271 on the lower side in the rotation direction (the right side in FIG. 18), only the feed action surface 274 is elongated, and is provided overlapping with the movable dust transfer valve portion 272 in a state in which the feed action surface 274 is located on the lower side in the processed article transfer direction, that is, on the rear side in the front-rear direction of the vehicle body.

The fixed dust transfer valve portion 271 is provided with a first fixed dust transfer valve portion 271a fixed to the inner surface of the right top plate constituent body 239, and a second fixed dust transfer valve portion 271b fixed to the inner surface of a plate-shaped portion 240A located on the right side of the left top plate constituent body 240. Similarly to the portion where the feed action surface 274 overlaps the movable dust transfer valve portion 272, at a portion where the first fixed dust transfer valve portion 271a and the second fixed dust transfer valve portion 271b are connected to each other, only the feed action surface 274 is elongated at a portion located on the lower side in the rotation direction of the first fixed dust transfer valve portion 271a (the right side in FIG. 18), and is provided overlapping with the second fixed dust transfer valve portion 271b in a state in which the feed action surface 274 is located on the lower side in the processed article transfer direction, that is, on the rear side in the front-rear direction of the vehicle body.

The movable dust transfer valve portion 272 is attached to the inner surface of the plate-shaped portion 240B located on the left side of the left top plate constituent body 240. The right top plate constituent body 239 corresponds to a fixed side corresponding portion, and the left top plate constituent body 240 corresponds to a movable side corresponding portion, and the fixed side corresponding portion is longer than the movable side corresponding portion. Furthermore, the fixed dust transfer valve portion 271 extends beyond the right top plate constituent body 239, which is a fixed side corresponding portion, toward the movable side corresponding portion along the circumferential direction.

The movable dust transfer valve portion 272 is pivotably supported by the top plate 230 such that the portion overlapping with the second fixed dust transfer valve portion 271b, which is an end portion on the upper side in the rotation direction, is pivotable around a pivot axis P2. An end portion of the movable dust transfer valve portion 272 on the lower side in the rotation direction (opposite to the second fixed dust transfer valve 271b) is configured to change and adjust the swing angle through manual operation via the adjustment member 275.

More specifically, the end portion of the movable dust transfer valve portion 272 on the upper side in the rotation direction is supported by a support shaft 276 with respect to the top plate 230. An end portion on the lower side in the rotation direction is bolted to an adjustment member 275. The adjustment member 275 is configured to be slidable through manual operation within the range of a long hole 277 (see FIG. 21). When a bolt is loosened and the adjustment member 275 is slid, the feed angle for transferring threshed articles can be changed and adjusted by swinging the moveable dust transfer valve portion 272 around the axis P2 (pivot fulcrum) of the support shaft 276. After the feed angle is changed, the bolt is fastened to fix the position thereof.

Another Embodiment of Second Embodiment (1) In the above-described embodiment, a configuration is adopted in which the top plate 230 is divided along the circumferential direction, the fixed dust transfer valve portion 271 is provided with the first fixed dust transfer valve portion 271a and the second fixed dust transfer valve portion 271b, but instead, as shown in FIG. 23, a configuration may be adopted in which the top plate 230 is formed as a single body in which the arch-shaped portion 230a and the plate-shaped portion 230b are continuous with each other along the circumferential direction, the fixed dust transfer valve portion 271 is provided which is formed as a single body in a state in which the fixed dust transfer valve portion 271 corresponds to the arch-shaped portion 230a of the top plate 230, and the movable dust transfer valve portion 272 in a state corresponding to the plate-shaped portion 230b is provided.

(2) In the above-described embodiment, a configuration is adopted in which the fixed dust transfer valve portion 271 is provided in a state in which the fixed dust transfer valve portion 271 is located on the lower side in the processed article transfer direction with respect to the movable dust transfer valve portion 272, but instead, a configuration may be adopted in which the fixed dust transfer valve portion 271 is located on the upper side in the processed article transfer direction with respect to the movable dust transfer valve portion 272.

(3) In the above-described embodiment, a configuration is adopted in which the top plate 230 is constituted by five dividing top plates 236 that are divided along the rotation axis direction of the threshing cylinder 234, and the five dividing top plates 236 are each constituted by two top plate constituent bodies 239 and 240 that are separated along the circumferential direction of the threshing cylinder 234, but instead, a configuration may be adopted in which the top plate 230 is constituted by four or less, or six or more dividing top plates, or a dividing plate is constituted by three or more top plate constituent bodies, for example. Alternatively, a configuration may be adopted in which a plurality of dividing top plates are formed as a single body continuous with each other along the circumferential direction of the threshing cylinder 234, or the top plate 230 is continuous as a single body without being divided along the rotation axis direction of the threshing cylinder 234.

(4) In the above-described embodiment, a configuration is adopted in which the receiving net 235 and the side wall portions 227 are divided along the rotation axis direction at the same positions as where the top plate 230 is divided, and are detachable in the same direction as the top plate 230, but instead, a configuration may be adopted in which they are divided along the rotation axis direction at positions different from those of the top plate 230, and are detachable toward a direction different from that of the top plate 230. Alternatively, a configuration may be adopted in which no receiving net or side wall portions are divided.

(5) In the above-described embodiment, a configuration is adopted in which the grain tank 205 and the engine 206 are provided above the threshing device 204, but instead, a configuration may be adopted in which the grain tank 205 and the engine 206 are provided in a state in which the grain tank 205 and the engine 206 are arranged side-by-side with the threshing device 204.

INDUSTRIAL APPLICABILITY

The present invention is applicable not only to an ordinary combine harvester, but also to a self-removing combine harvester.

DESCRIPTION OF REFERENCE SIGNS

4 Threshing device
5 Grain tank
6 Engine
20 Vehicle body frame
23 Threshing chamber
26, 27 Side wall portion
30 Top plate
31 Threshing cylinder
32 Receiving net
42, 45 Side wall upper end frame
53 Raking unit
54 Threshing unit
58, 59, 60 Dividing top plate
62 Support portion
63 Vertically oriented surface
64 Detachment prevention guide
65, 66 Upper frame
204 Threshing device
205 Grain tank
206 Engine
223 Threshing chamber
227 Side wall
230 Top plate
234 Threshing cylinder
235 Receiving net
236 Dividing top plate
238 Support frame
239 Fixed side corresponding portion (top plate constituent body)
240 Movable side corresponding portion (top plate constituent body)
251 Dividing wall
253 Dividing receiving net
262 Upper frame
270 Dust transfer valve
271 Fixed dust transfer valve portion
272 Movable dust transfer valve portion

The invention claimed is:

1. A combine harvester, comprising:
a threshing device configured to perform a threshing process of threshing reaped grain culm in a threshing chamber; and
a grain tank for storing grain obtained after being subjected to a grain removal process performed by the threshing device, the grain tank being provided above the threshing device,
wherein the threshing chamber includes a threshing cylinder configured to rotate around a front-rear axis, and an arc-shaped receiving net provided extending along an outer circumferential portion of the threshing cylinder,
wherein the threshing device is provided with side wall portions that define left and right sides thereof,
wherein left and right vehicle body frames are provided to support the threshing device and extend along a rotation axis direction of the threshing cylinder,
wherein left and right vertical frames are provided at both sides of the threshing device in a lateral direction and extend upward from the left and right vehicle body frames,
wherein left and right side wall upper end frames are provided and extend along the rotation axis direction at upper end portions of the left and right side wall portions,
wherein the grain tank is supported by the left and right vertical frames,
wherein the left and right side wall upper end frames are supported via the side wall portions by the left and right vertical frames, and
wherein at least a part of a top plate covering an upper portion of the threshing chamber is placed on and supported by the side wall upper end frames on both right and left sides to be movable in the rotation axis direction so as to be supported detachably along the rotation axis direction.

2. The combine harvester according to claim 1, wherein the top plate is constituted by a plurality of dividing top plates that are divided along the rotation axis direction.

3. The combine harvester according to claim 1, wherein the threshing cylinder is provided with a raking unit that is located on one end side in the rotation axis direction and that is configured to rake reaped grain culm, and a threshing unit that is located on another end side of the raking unit in the rotation axis direction and that is configured to thresh the reaped grain culm,
wherein a portion of the top plate that corresponds to the threshing unit is detachable along the rotation axis direction, and
wherein a portion of the top plate that corresponds to the raking unit is provided in a positionally fixed state.

4. The combine harvester according to claim 1, wherein support portions of the left and right side wall upper end frames that support the top plate are provided with a detachment prevention guide having a vertically oriented surface.

5. The combine harvester according to claim 1, wherein either one of the top plate and the side wall upper end frames is provided with a rolling element configured to roll in contact with the other one of the top plate and the side wall upper end frames.

6. The combine harvester according to claim 1, wherein either one of the top plate and the side wall upper end frames is provided with a slip promoting body configured to facilitate sliding movement.

7. The combine harvester according to claim 1, wherein an engine serving as a power source is provided above the threshing device,
- wherein two side portions in a lateral direction of the threshing device are provided with left and right upper frames that are supported by the left and right vehicle body frames and extend in the rotation axis direction, and
- wherein the grain tank and the engine are supported by the left and right upper frames.

8. A combine harvester comprising:
- a threshing device configured to perform a threshing process of threshing reaped grain culm in a threshing chamber,
- wherein the threshing chamber includes a threshing cylinder configured to rotate around a front-rear axis, and an arc-shaped receiving net provided extending along an outer circumferential portion of the threshing cylinder,
- wherein a top plate covering an upper portion of the threshing chamber is supported detachably along a rotation axis direction of the threshing cylinder,
- wherein the threshing device is provided with side wall portions that define left and right sides thereof,
- wherein upper end portions of the left and right side wall portions are provided with side wall upper end frames that extend along the rotation axis direction,
- wherein the top plate is placed on and supported by the side wall upper end frames on both right and left sides to be movable in the rotation axis direction,
- wherein support portions of the left and right side wall upper end frames that support the top plate are provided with a detachment prevention guide having a vertically oriented surface, and
- wherein the vertically oriented surface is located at an outer side of the top plate in the lateral direction.

* * * * *

UNITED STATES PATENT AND TRADEMARK OFFICE
CERTIFICATE OF CORRECTION

PATENT NO. : 12,144,284 B2  
APPLICATION NO. : 17/264088  
DATED : November 19, 2024  
INVENTOR(S) : Takafumi Mitsui et al.

Page 1 of 1

It is certified that error appears in the above-identified patent and that said Letters Patent is hereby corrected as shown below:

On the Title Page

Column 1, item (87) PCT Publication Date, Line 1, delete "May 6, 2020" and insert -- Feb. 6, 2020 --

Signed and Sealed this
Eighteenth Day of February, 2025

Coke Morgan Stewart
*Acting Director of the United States Patent and Trademark Office*